(12) United States Patent
Luja Hansen

(10) Patent No.: US 10,882,127 B2
(45) Date of Patent: Jan. 5, 2021

(54) GUIDE BLOCK ASSEMBLY FOR CONTROLLING A SAW BLADE

(71) Applicant: Søren Luja Hansen, Odense C (DK)

(72) Inventor: Søren Luja Hansen, Odense C (DK)

(*) Notice: Subject to any disclaimer, the term of this patent is extended or adjusted under 35 U.S.C. 154(b) by 0 days.

(21) Appl. No.: 16/316,271

(22) PCT Filed: Jul. 10, 2017

(86) PCT No.: PCT/EP2017/067214
§ 371 (c)(1),
(2) Date: Jan. 8, 2019

(87) PCT Pub. No.: WO2018/011120
PCT Pub. Date: Jan. 18, 2018

(65) Prior Publication Data
US 2019/0210128 A1    Jul. 11, 2019

(30) Foreign Application Priority Data

Jul. 13, 2016 (EP) .................................. 16179269
Mar. 29, 2017 (DK) ............................... 2017 70228

(51) Int. Cl.
*B23D 55/08* (2006.01)
*B23D 55/02* (2006.01)

(52) U.S. Cl.
CPC ........... *B23D 55/082* (2013.01); *B23D 55/02* (2013.01)

(58) Field of Classification Search
CPC .............................. B23D 55/02; B23D 55/082
See application file for complete search history.

(56) References Cited

U.S. PATENT DOCUMENTS

| 2,741,281 A | 4/1956 | Braun |
| 2,807,294 A | 9/1957 | Brown |
| 3,059,516 A * | 10/1962 | Cleland ................. B23D 53/00 83/435.11 |
| 3,534,647 A * | 10/1970 | Mills ...................... B27B 13/10 83/820 |

(Continued)

FOREIGN PATENT DOCUMENTS

DE    10 2006 037705 A1    2/2008

OTHER PUBLICATIONS

Machine translation of Bandsagenblattfuhrung-erneuert Auf dem Holzweg uterwegs. (Year: 2014).*

(Continued)

*Primary Examiner* — Stephen Choi
(74) *Attorney, Agent, or Firm* — Winston & Strawn LLP

(57) ABSTRACT

A guide block assembly for controlling a saw blade of a band saw during cutting. The assembly includes a mounting part having a rear part adapted for securing the guide block assembly to the band saw frame and a front part for detachably securing a thrust part. The thrust part includes at least two thrust slats detachably secured in the front part of the mounting part. The slats are aligned and spaced apart around a center section of the front part. When using the guide block assembly, vibrations, chattering and heating of the saw blade are substantially reduced, and the production rate and speed are increased. The guide block assembly is typically used for band saws that have a cutting speed of between 1800-6000 m/min, pulley wheels having diameters of 1000-2500 mm, and saw blade widths in the range of 80-360 mm.

35 Claims, 10 Drawing Sheets

(56) References Cited

U.S. PATENT DOCUMENTS

| | | | | |
|---|---|---|---|---|
| 3,848,493 | A | * | 11/1974 | Harris .................. B23D 55/082 83/168 |
| 3,872,762 | A | * | 3/1975 | McKillip ............. B23D 55/082 83/820 |
| 4,231,274 | A | * | 11/1980 | Matchette ............ B23D 55/082 279/34 |
| 4,336,731 | A | * | 6/1982 | Eklund .................. B23D 53/00 83/74 |
| 4,342,241 | A | | 8/1982 | Eklund |
| 5,109,744 | A | * | 5/1992 | Syre ....................... A22B 5/208 83/168 |
| 5,159,866 | A | * | 11/1992 | Dunham ............. B23D 47/005 184/55.1 |
| 5,235,885 | A | * | 8/1993 | Camarena ............. B23Q 11/02 384/42 |
| 8,240,236 | B2 | * | 8/2012 | Benz .................... B23D 47/005 83/169 |
| 2004/0163523 | A1 | * | 8/2004 | Belfiglio .............. B23D 47/005 83/523 |
| 2008/0017008 | A1 | * | 1/2008 | Brenton ............... B23D 55/082 83/820 |
| 2011/0226452 | A1 | | 9/2011 | Salter |
| 2017/0368622 | A1 | * | 12/2017 | Krebber ............... B23D 55/084 |

OTHER PUBLICATIONS

International Preliminary Report on Patentability, Appl. No. PCT/EP2017/067214, dated Jul. 26, 2018.

Hennemann, Bandsageblattfuhrung erneuert Auf dem Holzweg uterwegs. Nov. 6, 2014, 6 pgs. Retrieved from the Internet: https://aufdemholzweg.net/2014/11/06/bandsagenblattfuhrung-erneuert/. Retrieved on May 1, 2017.

Woodweb, "Winter Sawing, Blade Breakage, and Lubricant Choices," Aug. 31, 2009, pp. 1-11. Retrieved from the Internet: http://www.woodweb.com/knowledge_base/Winster_Saving_Blade_Breakage_and_Lubricant_Choices.html. Retrieved on Oct. 19, 2017.

* cited by examiner

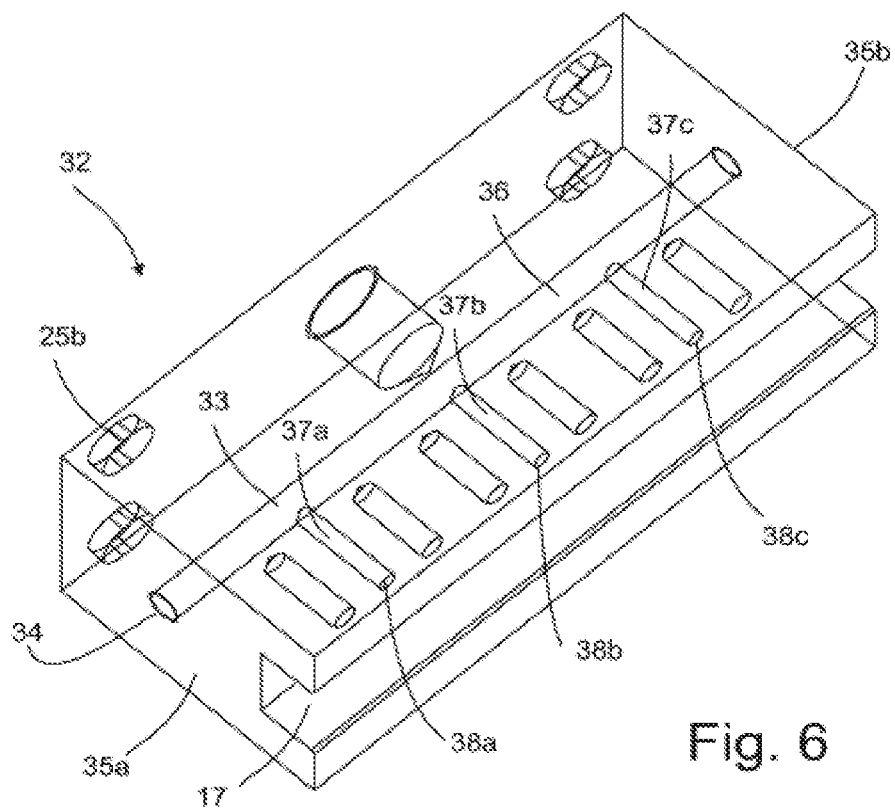
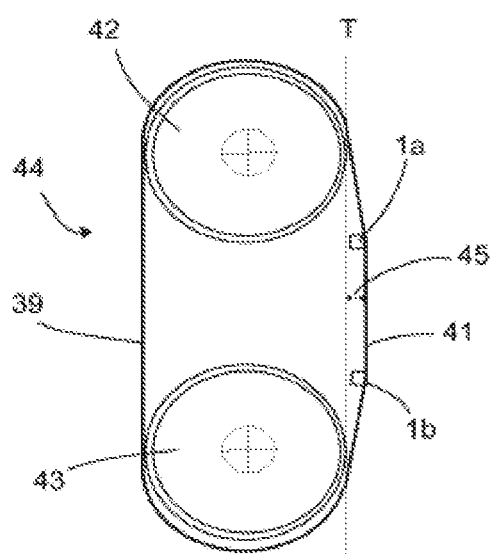
Fig. 6
Fig. 8
Fig. 9a Prior Art
Fig. 9b Prior Art
Fig. 9c

GUIDE BLOCK ASSEMBLY FOR CONTROLLING A SAW BLADE

This application is a 371 filing of International Patent Application PCT/EP2017/067214 filed Jul. 10, 2017, which claims the benefit of Danish application no. PA 2017 70228 filed Mar. 29, 2017 and European application 17169269.2 filed Jul. 13, 2016.

BACKGROUND

The present invention relates to a guide block assembly of the kind for controlling from one side only of a saw blade of a band saw, said saw blade during cutting by applying tension to said saw blade to arrange a cutting section of said saw blade offset and parallel to a tangent plane to the pulley wheels of the band saw, wherein the guide block assembly includes a mounting part having a rear part adapted for securing the guide block assembly to the band saw frame and a front part for detachably securing a thrust part.

Within the context of the present invention the term "controlling" and "controlling from one side of a saw blade" means guidance of a tensioned the saw blade over a thrust part of a guide block assembly from just one side of the saw blade without a counter guide block assembly on the other side of the saw blade.

An example of a mechanism used to decrease transverse motion of the saw blade by applying tension to it, is one or more blade guides or guide block assemblies, which act to guide the saw blade during cutting.

The aim of paramount interest when using a large band saw is to perform a uniform smooth cutting action. The load on the teeth of the saw blade must be kept under control, both as regards the curvature of the saw blade and the tensioning of the saw blade at the cutting location. So specifically, the field of technology of the present invention is the field of guide block assemblies configured for applying tension to and stretching the orbiting saw blade for a large band saw.

In particular the present invention relates to a guide block assembly for tensioning of the saw blade from just the interior side of the orbiting band of the endless saw blade in large band saw applications, such as in saw mills, where the cutting speed typically is between 1800-6000 m/min, or even higher, the pulley wheels typically have diameters of 1000-2500 mm, and the width of the saw blade is typically in the range of 80-360 mm. The person skilled in the art is aware that blade guides based on opposite rollers, and other blade guides that need to have a guide part on opposite sides of the saw blade, will not work effectively and stable, or cannot work at all on such a large band saw. So clear distinction must be made between guide block assemblies that are used for large band saws to tension the saw blade, and blade guides that simply are used to create a passing slot for the saw blade of small band saws.

The present invention further relates to a band saw having two spaced apart guide block assemblies of the present invention for keeping the endless saw blade of the band saw under tension and stretched. Two spaced apart guide block assemblies are arranged pressing, from the inside of the orbiting endless saw blade, on one leg of said orbiting endless saw blade, e.g. on the descending leg, the cutting section of said orbiting endless saw blade away from the opposite orbiting leg of the endless saw blade, in the present example away from the ascending leg. No counter-facing guide block assembly or guide control on the outside of the orbiting endless saw blade to the guide block assembly arranged on the inner side of the saw blade is present for the band saw of the present invention. Thus the guide block assembly of the present invention is for controlling the endless saw blade from just one side.

Band saws are used principally in woodworking, metalworking, and lumbering, but may be used to cut a variety of materials. The saw blade of a band saw is a continuous band of toothed metal rotating on opposing pulley wheels to cut the relevant material, often crowned pulley wheels, to help keep the saw blade aligned. Most band saws have at least two such co-planer pulley wheels or flywheels connected by the saw blade rotating in the same plane. One of the pulley wheels is powered.

Thus the saw blade is mounted to orbit on the pulley wheels with a diameter large enough to prevent or reduce metal fatigue of the saw blade due to flexing when the saw blade repeatedly changes from a circular to a straight profile. When the band saw is run the saw blade unavoidably becomes stretched very tight, and during running the cutting edge heats up. These forces and temperatures cause the saw blade to deform with the fatigue strength of the saw metal being the limiting factor.

Therefore band saws of large size need to have a deformation worked into the saw blade. This deformation counteracts the forces and heating of the saw blade during operation. The process of making this deformation is called "benching", which term equally often is used for the result of the "benching" process as well. This "benching" contributes in the leveling and tensioning of the saw blade when running around the pulley wheels offset from the rotation axes. Thus the benching deliberately deforms an un-mounted saw blade in a way that counteracts the operating stresses, and aims to allow the saw blade to pull flat and cut straight when in use.

The small band saw is typically used in joineries but not for cutting lumber as in a sawmill. Typically one or more sets of rollers each defining a low friction running surface or guiding slot between two spaced adjacent walls or rollers through which the running saw blade passes are used as blade guides for small band saws. Small band saws and blade guides that are arranged on both sides on the saw blade are not part of the present invention.

Within the context of the present invention distinction is made between a large band saw that requires high lateral tension and stretching of the saw blade using a one-sided guide block assembly for that purpose during cutting, and a smaller band saw that does not require any lateral tension and stretching of the saw blade at all during cutting, or just a very minimal lateral tension and stretching.

The "X-Life" blade guides from FELDER, Unit 2, Sovereign Business Park, MK8 0JP MILTON KEYNES, Great Britain is exclusively developed for use with a small band saw. The "X-Life" blade guide system utilizes two small bifurcated opposite guiding blocks, one on each side of the saw blade, and one "X-life" blade guide above the workpiece and one below said workpiece.

One bifurcated guiding block faces the interior side of the saw blade and the other bifurcated guiding block faces the exterior side of the saw blade. No tension is applied by any of the guiding blocks to the saw blade, nor is this intended or possible in the "X-life" design. The "X-Life" blade guide is an alternative to the conventional roller guides previously used by Felder and in other conventional small band saws and does not and cannot perform tensioning of the saw blade. The X-Life® ceramic band saw blade guides have been developed exclusively for the small Hammer and Felder bandsaws.

Each bifurcated guiding block of the "X-life" blade guide has a C-shaped main body having a width of about 30-35 mm selected to fit partly across the narrow blade of e.g. a joinery band saw, e.g. a width similar to or smaller than the width of the saw blade minus the width of the teeth. A guiding slot is defined between the two opposite spaced apart C-shaped main bodies of the bifurcated guiding block. The Felder 501 band saw e.g. uses a saw blade of about 50 mm and the "X-life" blade guide is initially designed for this machine. The C-shaped main body has free parallel legs with open-ended recesses. A block of ceramic material is firmly adhered inside and protruding from each recess, so that the ceramic block cannot dislocate if subjected to the vibrations from the band saw, and in case of too much contact with the saw blade during cutting. So the ceramic blocks are not detachable, nor can they act properly as thrust slats or thrust blocks as required for large band saws. As can be seen from the U-tube video at aufdemholzweg.net if just one ceramic block of an "X-life" blade guide needs replacement the entire C-shaped main body of the ceramic guide, must be replaced, first by removing bolts, and then demounting the entire bifurcated guiding block including the adhered integral guide block. So even if only one of the ceramic blocks are not worn the entire bifurcated guiding block must be taken off to replace the C-shaped main body. Because the entire "X-life" blade guide needs to be taken off the sawing machine, to replace the C-shaped main body, adjusting the guiding of the blade between the opposite blade guide needs to be done each time replacement of a C-shaped main body is done. This procedure is expensive and time-consuming. However, despite high costs, replacing an entire C-shaped main body of an "X-life" blade guide makes sense and is acceptable for small band saws where wear of rollers or ceramic blocks is very limited and less frequently needed compared to large band saws. The main function of the "X-life" blade guide is guiding the saw blade in between the oppositely arranged bifurcated guiding blocks aiming for control of the position of the saw blade but also aiming for minimum contact with the saw blade to avoid frictions and reducing cutting speed. No or substantially no pressing on the saw blade takes place and the technology of the "X-life" blade guide cannot be used at fast-running, heavy, wide bladed large saw mills.

In contrast thereto is the heavy frictional wear that arises during cutting using a large band saw, where keeping the saw blade stretched by means of a guide block assembly with a thrust part in contact with the saw blade during cutting is highly important to keep up cutting speed and production rate. Large band saws are used for cutting lumber and large trunks that require a much wider saw blade than the "X-life" blade guide a much more power.

For large band saws, such as in a sawmill, a guide block assembly is thus used to stretch and tension the endless saw blade. The load that needs to be placed on the saw blade of a large band saw is simply too high. For example a large band saw with a saw blade of 180 mm width and a thickness of 1.47 mm, which is strained at 200 N/mm$^2$ is subjected to a load as high as 50.000 N. Conventional blade guides used in small band saws will immediately deteriorate subjected to such load. Accordingly, none of rollers and "X-life" blade guides are suited to keep the saw blade constantly pressed against the front face, or faces of the guide block assembly by means of tensioning.

Instead typically a guide block assembly off the "sandwich" kind is used. The conventional sandwich guide block assembly has no moving parts and is used from inside the endless saw blade to apply tension and stretch the endless saw blade away from the pulley wheels at the cutting section. A sandwich guide block assembly is arranged on just on one side of the endless saw blade to provide a one-sided control surface for the saw blade by means of a thrust part in contact with the interior side of the saw blade. Irrespective of which kind of guide block assembly, it is affixed to the band saw, so the blade guide helps in preventing transverse motion of the saw blade while minimally affecting the desired rotatory saw blade motion while still tensioning, in particular tensioning the saw blade around the cutting section of said saw blade.

One conventional guide block assembly of the "sandwich" kind utilizes a large thick trust block that covers the entire area of the front part to avoid residues, such as saw dust and resins, from the cutting process to get inside other parts of the guide block assembly. The surface of the large thrust block becomes uneven and the thickness of the thrust block becomes smaller during use. After a period of running time, such as 10-40 hours, a worn thrust block must be replaced with a new thrust block, or the worn thrust block be trimmed and reinserted. The wear has a substantial impact on efficiency of the guide block assembly to keep the saw blade in the offset position tensioned away from the rotation axes and the tangent plane of the pulley wheels, thus the guide block assembly gradually looses its capability to properly tension the saw blade. To trim the workface of the thrust block this entire conventional guide block assembly must be dismantled. An already prepared other similar guide block assembly is then mounted, or the workface of the thrust block already in place is trimmed, optionally while it is still mounted to the front part, and the same or new guide block assembly is mounted to the frame of the band saw again. The thrust face, which is the workface, of this thick known thrust part can be made planar and smooth again several times but each time it is processed further in order to trim the workface it becomes thinner and the offset of the saw blade must be adjusted anew. Moreover, it is always the same face of the thrust part that is in action. The opposite face can never come in action due to the design of the thrust block being bound by the design of the front part. Thus the tensioning of the saw blade must be measured and adjusted again and again each time the thrust block needs processing to perform according to its intended function. Operational time of the conventional guide block assembly is typically about 10-50 hours for a thrust block of a height of about 40-50 mm, e.g. when in use on large saw mills.

Another known conventional guide block assembly of the "sandwich" kind utilizes a single large trust plate that is thinner than the thrust block discussed above. This known thrust plate is mounted to the front part by clamping to a coupling means or by means of screws at the top and at the bottom of the front part with the result that the central area is free to bulge towards the band saw, thus the front face of the thrust plates becomes concave and can flex. The thrust plate covers the entire area of the front face of the guide block assembly. When its workface becomes worn the thrust plate is turned so the workface becomes the bearing face towards the front part, however not a good bearing face due to being worn, which creates a negative impact on cutting accuracy and cutting efficiency. Operational time is about 20-30 hours for a first run of a thrust plate of a height of about 40-50 mm, and the same after having being turned. After two such runs the thrust plate is discarded. A guide block assembly of this kind can e.g. be obtained from Interteknik Försäljning AB, Mallslingan 13, 18766 Täby, Sweden.

A tiltable head portion of a guide block assembly for use in a large band saw for cutting trunks are disclosed in U.S. Pat. No. 4,342,241. This known guide block assembly is used to keep the saw blade constantly tensioned during cutting by tilting the head portion. The protruding solid head portion is pivotally secured to a body portion of the guide block assembly and the pivoted position of the solid head portion is continuously adjusted so that contact with the saw blade is always at its optimum. The head portion of this know guide block assembly has one single wide continuous surface in contact with the saw blade during cutting and neither a detachable thrust block nor thrust slat(s). Replacement of the head portion is furthermore completed due to the in-build tilting functionality. It has now been realized by the inventor that the center section of the thrust block and of the thrust plate may hardly be worn, and that this section of the thrust block or thrust plate has a very limited tensioning function.

The structure of the known guide block assemblies is a result of many years of tradition, and of the general belief among carpenters, operators and manufacturers of saw mills and band saws, that a large thrust face performs the best and the remaining parts of the guide block assembly shall be as little as possible exposed to the saw blade, the workpiece, as well as to residues that is created during cutting, which residues include both residues from the workpiece, such as sawdust and resins, but also residues worn off the thrust part, such as fibers.

This belief has established a prejudice within the art of band saws that deprives the skilled person from deviating from the known design of thrust parts and guide block assemblies.

The present invention aims to remedy the disadvantages of the prior art guide block assemblies of the sandwich kind for large band saws. The present invention also aims to overcome the prejudices within the art of making guide block assemblies for large band saws by providing alternatives to the known guide block assemblies.

SUMMARY OF THE INVENTION

It is main aspect of the present invention to provide a guide block assembly of the kind mentioned in the opening paragraph that allows the thrust part to be replaced at minimum downtime of the band saw.

It is yet an aspect of the present invention to provide a guide block assembly of the kind mentioned in the opening paragraph that is easy and fast to mount to the band saw and makes the band saw cost-effective in use.

It is yet an aspect of the present invention to provide a guide block assembly of the kind mentioned in the opening paragraph that gives a band saw a higher output capacity than with a conventional guide block assembly.

It is yet an aspect of the present invention to provide a guide block assembly of the kind mentioned in the opening paragraph by means of which the vibration and the chatter of the saw blade are minimized.

It is yet an aspect of the present invention to provide a guide block assembly of the kind mentioned in the opening paragraph by means of which control of lateral drifting of the saw blade from the cutting position can be kept minimal.

It is yet an aspect of the present invention to provide a guide block assembly of the kind mentioned in the opening paragraph by means of which the development of thermal energy and heating of the saw blade during the cutting is reduced.

It is yet an aspect of the present invention to provide a guide block assembly of the kind mentioned in the opening paragraph that stabilizes and keeps the saw blade tensioned during cutting.

It is yet an aspect of the present invention to provide a guide block assembly of the kind mentioned in the opening paragraph that facilitates a clean cut.

It is yet an aspect of the present invention to provide a guide block assembly of the kind mentioned in the opening paragraph that prolongs the lifetime of the saw blade.

It is yet an aspect of the present invention to provide a guide block assembly that contributes to enhancing operational accuracy and consistency.

The novel and unique whereby these and other aspects are achieved according to the present inventions consists in that
  the thrust part includes at least two thrust slats detachable secured in respective at least two receiving means of or on a front face of the front part of the mounting part, which thrust slats are aligned spaced apart from each other.

Within the context of the present application the term "rear part" is the part of the guide block assembly used to mount the guide block assembly to the band saw at an appropriate location. The term "thrust part", "thrust block" or "thrust slat" is the part of the guide block assembly that is in contact with the orbiting saw blade to keep the saw blade stretched and under tension when the band saw is running offset. The "thrust part", "thrust block" or "thrust slat" is thus the part of the guide block assembly subjected to wear. The term "front part" is the intermediate component(s) of the guide block assembly used to mount the thrust part to the rear part and allows the replacement of the "thrust part", "thrust block" or "thrust slat". The "rear part" and the "front" part may be an integral unit. The "rear" part may simply be the part of the front part that faces away from the saw blade in use of the guide block assembly.

Within the context of the present application the term "inside" or "interior face" of the sawband is the face closest to the band saw, thus the face of the endless saw blade that runs over the pulley wheels and is in direct pressing contact with the thrust slats, and the "outside" or "exterior face" of the endless saw blade is the free face opposite the "inside" or "interior face" of the endless saw blade. The "outside" or "exterior face" does not have operative contact with a guide block assembly or part of such. Within the context of the present application the terms "saw blade", "saw band", and "endless saw blade" are used interchangeably.

A blade on a large band saw requires strain and lots of it to consistently produce straight, uniform cuts, especially in thick or dense stock materials, such as thick workpieces. Level of recommended tension differs depending on whether or not the band saw is large or small and on the material of the saw blade. E.g. most saw blade manufacturers recommend 100 N/mm$^2$ to 140 N/mm$^2$ for a common carbon-steel saw blade for a smaller and saw, and even higher strain of 175 N/mm$^2$ to 200 N/mm$^2$ for bimetal, spring-steel, and carbide-tipped saw blades because these materials are much stronger than the carbon-steel saw blades. Strain between 110 N/mm$^2$-300 N/mm$^2$ for saw blade of chromium-nickel steel is typical. The tighter the saw blade is stretched, the more rigid it becomes and the less tendency it will have to deflect in the cut, but many of todays large band saws operate at even higher strain of the saw blade and higher cutting speeds, so that very heavy wear is induced to the thrust parts when one-sided tension is applied to the saw blade.

The constant frictional contact between the stretched and tensioned saw blade results in heating of the saw blade. Moreover, this contact causes wear on the thrust part when the saw blade runs. The longer the thrust part is run over by the saw blade the more the thrust part is worn and the less efficient it becomes in keeping the saw blade stretched and tensioned. A thrust part is worn the most at the end towards the cutting edge of the saw blade, thus worn the most in at the end facing the teeth of the saw blade. The thrust part becomes bend at the cutting edge the more the thrust part is worn, so that larger tension is on the read edge than on the cutting edge of the saw blade. Since the read edge of the saw blade is worn less than the cutting edge the saw blade then tend to bend away from its cutting plane, and the more the cutting edge bends the more lopsided a cut.

As mentioned, the contact between thrust parts and orbiting saw blade generates a lot of heat, and thus a lot of deflection of the saw blade, and both the saw blade and the thrust parts becomes less and less efficient and capable of making smooth cuts. While the replacement, optional trimming, and subsequent fitting takes place the band saw is out of operation and valuable production time is thus lost.

For the present invention the thrust slat can be taken off the guide block assembly while the guide block assembly still is on the band saw. The worn thrust slat is simply slide sideways out of the receiving means via the end face of the front part. A new thrust slat or an inverted or turned thrust slat is then promptly inserted by the reverse translatory motion, a sideways insertion from the end face of the front part. The thrust slats of the present invention are thin, and easy to handle, and the exchange of a thrust slat can be done, without using heavy tools, in a fast and efficient manner.

By spacing the thrust slats apart the combined area of workface in operative contact with the saw blade can be kept substantially the same as for a conventional thrust part but the total area of guide block assembly that faces the saw blade may be much larger because the height of the guide block assembly of the present invention becomes higher than for conventional guide block assemblies. Thus the total area of thrust part in contact with the saw blade need not be. The thrust and the tensioning of the spaced apart opposite thrust slats are effective over an even longer length of the saw blade than for the thrust plate without wasting additional thrust material.

The guide block assembly of the present invention serves to move the saw blade away from the rotation axes of the pulley wheels to arrange a cutting section of the cutting section of the saw blade offset and parallel to a tangent plane to the pulley wheels, where this cutting section of the saw blade is kept steady and under firm control. The radius of the curvature of the saw blade that runs over the combined workface of the opposite spaced apart thrust slats can for the design of guide block assemblies of the present invention advantageously be increased, so that the saw blade has a substantially smoother curvature when it passes over the guide block assembly. Thereby the stability of the saw blade becomes enhanced, and chattering of said saw blade and production of thermal energy are reduced to an inferior level, or at least reduced substantially compared to when using known guide block assemblies.

A further advantage is the versatility of possible orientations. For example the thrust slat can be dismantled, rotated 180° in the saw blade contact plane and reinserted in the same receiving means. In the alternative a thrust slat is simply taken out of a receiving means and inserted in another receiving means in the same orientation, thus without having been rotated, to reuse a non-worn elongate part of a thrust slat. Yet another beneficial way of reusing the thrust slat of the present invention is to make the interior face of said thrust slat, which interior face has been spared by being hidden inside a free space in the receiving means, the new exterior face, thus turning the interior face of the thrust slat so it becomes the workface of the thrust slat. A worn face of the thrust slat can also be made functional again, e.g. by abrasion, polishing and/or cleaning processes. However such processing can be postponed for long because a thrust slat can be repositioned in four different useful orientations, each of which expose fresh thrust slat material to the saw blade without the need for the above processes of restoring a smooth workface of the thrust slat.

An alternative but less attractive way of replacing a thrust slat, that is also possible but slightly more time-consuming, is to first dismantle the entire front part with the thrust slats, then the thrust slats are replaced as described above.

Once the one or more new trusts slats are arranged in the receiving means, the refitted front part is mounted to the rear part again.

In case of uneven wear of the at least two thrust slats the operator can chose to maintain the least worn thrust slat(s) and only replace the thrust slat(s) that have been worn the most, or the operator may chose to swap two opposite thrust slats around and/or turn a thrust slat without making a huge negative impact on the uptime of the band saw. A thrust slat can even be made so thin that it is not worth refitting and reusing it. It may simply be disposable and for one-time use only.

By means of the thrust slats of the present inventions the operational consistency of the band saw is enhanced and cutting accuracy kept high for a long time. The offset of the endless saw blade from the rotation axes of the opposite pulley wheels to the front face of the thrust slats can be kept substantially constant, thereby avoiding deviations in measure settings and/or impaired guiding of the saw blade. Furthermore, the improved control of the curvature and tension of the saw blade when it passes over the guide block assembly of the present invention reduces friction and thus reduces development of thermal energy.

In an advantageous embodiment a thrust slat can be arranged in the respective receiving means so that it can move from side to side when not subjected to the force from the running saw blade. So although a thrust slat of the present invention is confined or retained inside a receiving means it is allowed some lateral movement along the length of the receiving means before the guide block assembly is used to tension and stretch the saw blade. The lateral movement and ability of the thrust slat to move from side to side inside the receiving means is feasible e.g. by dimensioning the detachable thrust slat properly, e.g. making it shorter than the receiving means.

The lateral movement and ability of the thrust slat to move from side to side inside the receiving means when not under tension does not exist in the known guide blades and guide block assemblies, in which known guide blades and guide block assemblies the thrust part is always secured inside the receiving means, e.g. by adhesion or screwed directly into the receiving means. When the band saw is in operation the thrust slat is pressed back in the front part and the ability to move laterally is reduced or stops however this feature allows the thrust slat to expand so that it does not bulge and/or bend when subjected to friction, heat and pressure.

The guide block assembly may comprise retaining means for retaining the thrust slats in the receiving means.

The appropriate retaining means for the guide block assembly of the present invention can be selected from the group comprising engagement means, force fitting means, snap coupling means, and/or male/female coupling means.

An alternative retaining means can be at least one end stop, such as at least one end stop at an end of the front part to block the open end of said retaining means.

As an alternative or additionally retaining means end stops may be fastened to or in the vicinity of the end faces of the front part, e.g. one at each end, or just one end stop at one end face of the front part. The end stops can be secured at an end face of the front part simply by means of first screws.

The retaining means for retaining the thrust slats in the receiving means excludes adhesives that adheres the thrust slat(s) inside and/or to the receiving means, and/or screws that are screwed into the thrust slat(s).

The front part may be detachable assembled with the rear part by means of second screws or bolts that extend through the front face of the front part between the thrust slats and into the rear part, thus not through the thrust slats, which are also not subjected to adhesive attachment inside the receiving means.

End stops at opposite ends of the front part may serve to retain the thrust slats more or less firmly in the receiving means, or simply be provided to prevent access to tampering with the thrust slot. The end stops prevent the lateral moveable thrust slat from been ejected or being exposed from the receiving means when subjected to the forces from the orbiting endless saw blade. So the end stops may be provided to prevent accidental release of the thrust slats, and to allow easy intentional and fast demounting and mounting of the detachable thrust slat, e.g. if it shall be replaced with a new one or be re-orientated for reuse of a not worn surface. The end stops may also be contributory to the firm securing of the thrust slats in the receiving means.

Simply by releasing and temporarily removing one or both of the end stops the thrust slats become free to slide sideways out of the receiving means. This operation can be done without demounting the entire guide block assembly from the band saw frame, as is inevitably and unavoidably needed in the prior art. The detached end stop(s) can quickly be mounted again, e.g. by means of screws, to close the receiving means at opposite ends thereby retaining the thrust slats firmly again ready for operation. The orientation of the guide block assembly is not altered and need not be altered during this action, and operational parameters relating to the guide block assembly is the same before and after maintenance of the guide block assembly. Consequently there is no need for re-adjusting tensioning and control stretching of the saw blade because the guide block assembly is in the same position as prior to manipulation of ends stops and thrust slats. The down time of the band saw/saw mill is substantially reduced because maintenance of the guide block assembly is so fast and easy.

Emphasis is made that the retaining means for retaining the thrust slats in the receiving means does not utilize adhesives that adheres the thrust slat(s) inside the retaining means nor does the retaining utilizes screws that are screwed into the thrust slat(s) and thus are invasive on the thrust slat.

The second screws or bolts may be hidden behind the thrust slats or pass through the goods of the front part at a center section defined between the opposite spaced apart thrust slats.

As alternative to end stops for keeping the at least two thrust slats inside the associated at least two receiving means when the band saw runs the saw blade over said thrust slats, the front part and/or a thrust slat can have engagement means, force fitting means, snap coupling means, and/or male/female coupling means. Such means can conveniently be arranged on the interior side of the thrust slat and on the bottom of the receiving means to co-operate, optionally interconnect, with each other. For some of these embodiments the thrust slat has less possible orientation options than when using end stops because of a necessary structural modification of the interior face of the thrust slat. However, if e.g. the receiving means is sized and dimensioned to receive a slightly larger thrust slat, such as slightly thicker and/or higher than exactly defined by the receiving means, the thrust slat can be force-fittingly mounted in the receiving means. In this embodiment the four possible ways of using and reusing the thrust slat are preserved.

The guide block assembly of the present invention is superior to the conventional sandwich-structured guide block assembly on the one hand because the thrust slats can be replaced and mounted from the end face of the front part while the guide block assembly is still on the band saw, and on the other hand because the guide block assemblies of the present invention, which has a distance between opposite individual thrust slats, provide superior stability to the saw blade, less or even eliminated chattering, less stress at the entry and exit contact points/edges to the guide block assembly, and a substantial decrease in heat development. Wear down of the thrust slats may take comparatively longer when chattering of the saw blade and development of thermal energy is considerably reduced. In addition, not needing to take the guide block assembly off the saw blade for replacing a thrust slat, means less downtime, less material costs, and reduced production costs. Valuable production time can be saved when using the guide block assembly of the present invention. And moreover, the simple replacement process, as well as the improved cutting, makes the working environment far friendlier than when using the prior art guide block assemblies.

In an expedient embodiment the receiving means of the front part of the mounting part are opposite parallel grooves for detachably securing a respective thrust slat. One upper groove may be provided at the top of the front part and one lower groove may be provided at the bottom of the front part spaced apart from the upper groove. Emphasis is made that the terms "upper", "lower", "top" and "bottom" should not be construed as limiting the scope of the present invention. These terms is simply used in order to refer the mutual spacing of the receiving means and the thrust slats. Thus if a guide block assembly is turned 180° in a vertical plane "upper" may become "lower" and "top" may become "bottom". Two thrust slats may be provided symmetrically at the front face of the front part about a longitudinal axis of said front part. The outmost free face of the front face of the front part constitutes the bearing face, which the thrust slats are pressed against by the saw blade to offset said saw blade from the tangent plane to the pulley wheels, which tangent plane is opposite the plane through the leg of the saw blade that is not tensioned by a guide block assembly. This bearing face stops the thrust slat from being moved further towards the rear part by the pressure force subjected to it by said saw blade.

Any of the rear part and the front part may conveniently be made from solid metal blocks, preferably made from rectangular solid metal blocks, e.g. aluminum. With regards to the front part a solid front part can easily be provided with the receiving means in form of grooves by milling or laser cutting. Moreover, solid metal block is durable and able to tolerate the heavy force application from the large band saw without deteriorating and yielding, as conventional rollers and the X-life blade guide would do instantaneously. Coupling means for coupling the front part and the rear part together can be made in a similar manner.

In an embodiment that is particular easy to use at least one of the thrust slats is an H-profile and the corresponding receiving means is a C-groove.

Typically a front face of a front part may have two spaced apart, aligned receiving means in form of an upper C-groove and a lower C-groove. The opposite free ends of the C-shaped groove project as hooks at the front part. The opposite free ends fit slidingly inside the opposite gaps defined between the opposite legs of the H-shaped thrust slats. The upper receiving means and the lower receiving means with inserted associated thrust slats need not have entirely identical design. One set can e.g. be wider than the other or even have a different profile. The surface of the thrust slat that is in contact with the saw blade may be free of protrusions or other topography that might interfere on the saw blade during its orbiting. The thrust faces of the thrust slats, thus their workfaces, should at the best be as smooth as possible as long as possible. No part of the front part gets in direct contact with the saw blade. The thrust slat may in one embodiment have same width as the conventional thrust part but be less high. So even if the thrust slat is as thin or even thinner than the thrust plate of the prior art, the trust slat cannot bulge. It simply lacks free slat material to do so and furthermore the configuration of the receiving means counteracts the possibility of deformation of the thrust slats.

A thrust slate can e.g. be made of a hard fibre composite material such as carbon fibre, bakelite and/or fiber glass, and combinations thereof.

The receiving means are described as a female part and the thrust slat as a male part. Within the scope of the present invention the receiving means can also be the male part and the thrust slat be the female part. Any complementary coupling profiles are within the scope of the present invention.

In order to make the front part easy to detach from the rear part, said rear part may have a first coupling profile facing towards a mating second coupling profile of the front part. The first coupling profile can e.g. be a male coupling groove and the second coupling profile be a female elongate protrusion dimensioned to engage the male coupling groove, so that when the front part is assembled to the rear part mutual dislocation is effectively prevented.

An elongate center section of the front part between the spaced apart receiving means may in an advantageous embodiment have at least one through-opening or hole configured for securing the front part to the rear part through the front face of said front part, e.g. by means of bolts that are countersunk in relation to the front face of the front part. More than one through-opening can be provided.

The length of a receiving means may be a bit longer than the length of a thrust slat to provide a slight degree of freedom to move from side to side when subjected to the force from the running saw blade. This freedom to move slightly from side to side also provides space for the thrust slat to expand lengthwise when heated by the frictional contact with the saw blade so that the tensioning of the saw blade is almost unaltered irrespective of raised temperature and potential expansion of the thrust slat. The possibility of a thrust slat to travel slightly from side to side contributes to reduce development of frictional heat thereby prolonging the lifetime of the saw blade itself.

The deviation between the above lengths of a receiving means and of a thrust slat may be so inferior that it is hardly noticeable. The deviation may e.g. be between 0.1 mm and 1 mm.

Cutting without coolant agent, lubrication agents and/or cleaning agents may result in chattered cuts and/or burrs on the cut edge. Accordingly, such agents may be used to improve the cut of a band saw, to prolong the lifetime of the saw blade and to reduce development of heat during cutting and resulting deflection of the saw blade. Traditionally such agents are applied to the saw blade by spraying via special nozzles onto the saw blade while the saw blade orbits around the pulley wheels, and/or is applied via felt pads. The agents may be air, gas, oil or water, and combinations thereof.

Such separate nozzles are however not needed in an embodiment of the present invention where functionality of applying such an agent to the saw blade is integrated in the guide block assembly. To that aspect the rear part may have an integrated manifold for supplying the agent. The manifold may e.g. discharge the agents mentioned above, such as a lubricating oil, via a plurality of outlets at the center section of the front part free of thrust slat, thus in the gap between the thrust slats, e.g. a gap between two opposite elongate thrust slats mounted to an elongate front part.

An advantageously thrust slat may have a surface that reduce friction when said surface is brought in contact with the running saw blade.

A single end stop may span the open ends of at the at least two receiving means at the end faces of the front part and be secured to such an end face of the front part for retaining the at least two thrust slats using one and the same single mechanical component. Thus when a single end stop, which is situated at or on an end face of the front part, is released all thrust slats are set free to be pulled sideways out of the receiving means. Just one of the opposite end stops needs to be released in order to replace all thrust slats, however if both end stops are releasable/released it does not matter from which end replacement of thrust slats takes place. The operator can chose the most accessible and convenient end. The single end stop can in the alternative be an end stop for each end of each receiving means.

The actual area of thrust slats in contact with the saw blade can, as already mentioned above, be the same as for a conventional thrust part simply by spacing the thrust slats apart and making the guide block assembly higher than the known guide block assembly. This design has the advantage that the path of the saw blade over the thrust slats becomes smooth compared to the paths when using the prior art guide block assemblies.

The guide block assembly according to the present invention may further comprise a blade scraper component for cleaning the saw blade.

In use of the guide block assembly on a band saw where there is a need to keep the cutting section of an endless saw blade under tension, one "upper" guide block assembly is provided above the workpiece, or at the entry of the cutting section of the endless saw blade, and one "lower" guide block assembly is provided below the workpiece, or at the exit of the cutting section of the endless saw blade. In the preferred embodiment just the "upper" guide block assembly is of the kind having a blade scraper component. Typically the "lower" guide block assembly is provided very close to the object being cut so that there is insufficient space for a blade scraper component, however in some special embodiments a blade scraper component can be provided at both the "upper" and the "lower" guide block assembly.

The amount and kind of e.g. cuttings, chips and other residues and deposits from the cutting process depends on the saw mills, band saw and objects to be cut, but in some applications and cutting processes there is a tendency that the saw blade carries along such residues and deposits, and the blade scraper component mounted on at least the "upper" guide block assembly advantageously serves to prevent accumulation of such residues between the thrusts slats when the band saw are operative, thereby serving to keep a steady operation of the band saw and to the prolonged up-time of the saw mill and band saw. The blade scraper component should not be mixed up with the blade scraper component that keeps a pulley wheel free from similar accumulations and deposits, however both a blade scraper component and a pulley wheel scraper may conveniently be provided in an optimum configuration of a large band saw running provided with the guide block assemblies of the present invention. Cleaning the endless orbiting saw blade using the blade scraper component also has the advantage that the saw blade runs very steady and in constant position, in particular lateral oscillation is reduced substantially.

To clean the saw blade the guide block assembly of the present invention may have a scraper edge which is above and spaced from the thrust slat that has the first contact with the saw blade, thus the "upper" thrust of the guide block assembly that meets the orbiting tensioned saw blade first. By spacing the cutting edge of the blade scraper component away from the "upper" thrust the scraped off component can be thrown off the saw blade well before they reach the guide block assembly so that they cannot get inside the gap between the opposite thrust slats of the corresponding guide block assembly.

The blade scraper component may comprise an angle brace mounted on the mounting part so that the position of the blade scraper component can be altered both when it comes to the contact angle against the saw blade and the distance to said saw blade. Preferably the angle brace is mounted on the rear part of the mounting part so that the angle brace can slide to and from the saw blade. Various scrapers can be fitted on the angle brace, e.g. scrapers having different cutting edge angles.

Advantageously the blade scraper component is mounted protruding from the guide block, so that the angle between the legs of the angle brace is larger than 90° and smaller than 180°, which angle range provides a suitable space between the thrust slat and the scraper edge so that undesired matter and substances are removed from the saw blade thereby assisting in keeping the gap between the trust slats free of deposits and accumulations.

A further advantageous feature of the guide block assembly of the present invention may be a fluid guiding component for blocking a part of the gap between the opposite thrust slats closest to a rear edge of the saw blade. The fluid guiding component advantageously serves to control the path of the fluid agent supplied to the saw blade from outlets situated between the thrust slats, e.g. pressurized air to blow the gap between the thrust slats continuously free of accumulations and deposit that might enter said gap despite the presence of the blade scraper component. Thus the fluid guiding component serves to direct and guide the fluid agent away from itself towards the open opposite end of the elongate gap between the thrust slats, preferably this open end is the end situated closest the teeth of the saw blade. The fluid guiding component advantageously saves a considerable amount of cleaning fluid. E.g. when cutting very moist wood large amounts of air as a cleaning fluid is often needed to avoid that wet or humid cuttings accumulate in the gap between the thrust slats. The fluid guiding component, which advantageously may be detachable mountable in the elongate gap or space between the thrust slats, reduces the amount of air needed to keep the guide block assembly operational stable by keeping said gap free and directing the cutting waste away from the band saw.

In a simple embodiment at least the rear part and the front part of the mounting part is an integral unit made by machining a solid metal block or made by molding. In such an embodiment no assembling of subcomponents are needed and time can be saved for such assembling. Also a scraper and a fluid guiding component can be made integral subcomponents in this manner. When using the above mentioned integrally made guide blade assemblies it is however not possible to replace the subcomponent or adjust their mutual positions. The thrust slats and the end stops should preferably be replaceable subcomponents of the guide block assemblies of the present invention.

The rear part may have means for securing the guide block assembly to the band saw frame in an easy manner.

In a preferred embodiment said means of the rear part for securing the guide block assembly to the band saw frame can include a rod coupling, in which case the rod coupling may have a rod connected to or integral with the rear part and protruding therefrom to be able to reach to the band saw frame and still also allow the guide block assembly to protrude from said band saw frame to distend the saw blade during its orbiting.

In an advantageous embodiment the rod of the rod coupling can have a through-going bore in fluid communication with the manifold to supply to the manifold e.g. a lubricating agent to lubricate the saw blade during cutting, a coolant agent to cool the saw blade during cutting, and/or a cleaning agent to keep the gap between the thrust slats free of residues from the cutting, thereby optimizing operative conditions of the band saw.

The inlet or inlets to the manifold can be provided at any appropriate location of the rear part, including via the top face, the bottom face and almost any imaginable location. Moreover the sub-channels of the manifold, inlet channels and a potential outlet channel, can at any desired angle to the face of the part having the inlet.

In order that the fluid guiding component does not come in direct wearing and frictional contact with the orbiting saw blade an exterior face of said fluid guiding component may be retracted from the plane of the thrust faces of the thrust slats. Thus the fluid guiding component does not take any part in the thrust face nor is the fluid guiding component involved in stretching and tensioning of the saw blade. The fluid guiding component only serve as a screen in front of the outlets for the cleaning fluid which are closest to the band saw so as to direct and guide spend fluid and waste away from the band saw.

There are four points of discontinuity of the curvature of the orbiting offset saw blade, thus points where the saw blade enters and exits the guide block assembly. Each point of discontinuity has an angle of incidence and an angle of reflection. For the present invention the angle of incidence and the angle of reflection may be of substantially same size for an offset saw blade.

In case of a vertical band saw where the band saw orbits in a vertical plane there may be an upper guide block assembly above a lower guide block assembly arranged around a cutting section of the saw blade. For the present invention the angle of reflection of the saw blade at the upper guide block assembly and the angle of incident of the saw blade at the lower guide block assembly are substantially the same with the aim of getting these angles as close to zero as possible. These angles can e.g. be between 5-15°. The smooth curvature of the saw blade when it passes over the guide block assemblies reduces stress at the saw blade substantially, as well as reduces wear of both saw blade and thrust slats. The tensioning and stability function is thereby improved, and the period until replacement of the thrust slats is needed is longer than for the known thrust parts so that operational and/or productive time of the band saw is prolonged.

The thrust slats are smaller and of less weight than the conventional thrust parts and thus easier to manipulate. Since less material is used for a thrust slat than for a conventional thrust part, the guide block assembly of the present invention is also less expensive. Yet a further advantage is that the complete guide block assembly need not be dismantled the band saw to replace a thrust slat. Since the pressure from the orbiting band saw itself suffice to keep a thrust slat in place inside a receiving means, such as a groove, thrust slats can simply be introduced from the end of a groove in a sliding fast movement and by a single operation. In case an end stop is provided at one end of a groove, although not mandatory, the replacement thrust slat can advantageously be inserted from the opposite end of the groove in a translatory motion. When the thrust slat hits on the end stop the operator knows that the thrust slat is in correct position and the band saw can be up and running within minutes without any special tools have been needed. In case of an embodiment without end stops the operator may simply use his hand or another suitable means to temporarily mimic the end stop.

Preferably the thrust plate is ⅓ longer than the width of the saw blade. Since the thrust plate is worn the fastest at the ⅓ closest to the cutting edge of the saw blade the rest of the thrust slat can be reused without any trimming. Thus a thrust slat can be turned and rotated for a total of four uses without being trimmed.

The present invention further relates to a method of mounting thrust slats in the guide block assembly described above.

The method comprises the steps of
(a) inserting the at least two thrust slats into the respective at least two receiving means by sideways sliding from one end face of the front part towards the opposite end face of the front part, and optionally
(b) securing at least one end stop at an end face of the front part.

The securing of step (b) may conveniently be achieved e.g. by an end stop having an outline corresponding substantially to the cross-section of the front part, provided the end stop do not protrude beyond the thrust slats when mounted to the end face of the front part, e.g. by means of screws. The end stop must not contact the orbiting saw blade. Replacement of a worn thrust slat with a new one or reorientation of a current thrust slat to use a not worn part of it, thus a surface that has not previously been subjected to wear from contact with the orbiting saw blade, can thus be done while the guide block assembly is still on the band saw. The end faces of the guide block assembly are easy to access and manipulate even when said guide block assembly is still on the band saw, so valuable operation time and costs can be saved due to substantially reduced down time and because re-tension and repositioning of the guide block assemblies are often not needed at all or can be kept minimal.

The present invention further relates to a method of mounting the guide block assembly described above to a band saw.

The method comprises
mounting the front part to the rear part via the front face of the front part, and
mounting the rear part to the band saw so that the thrust slats are in contact with the saw blade to tension said saw blade during cutting.

The distance between the individual thrust slats of a guide block assembly of the present invention, thus the gap between said opposite substantial parallel thrust slats that define the free center section, may be selected so that the total height of the work face of the guide block assembly is higher than conventionally.

A known thrust plate may e.g. be 40 mm, which also means that the total height of the associated known guide block assembly is close to 40 mm. For the present invention two thrust slats each being e.g. 20 mm high may be mounted spaced apart at a distance of e.g. 30 mm so that the total height of the guide block assembly is about 70 mm, which contribute to the increase the radius of curvature, and thus obtain a smooth curvature, of the band saw when it orbit over the guide block assembly. The above heights given for thrust slat and center section should not be construed as limiting the present invention. Even higher thrust slats and center sections are contemplated within the scope of the present invention. Heights of thrust slats between 10-100 mm are within said scope. Heights of center sections, thus the gap between the thrust slats, may be within same range.

The present invention further relates to a band saw provided with two guide block assemblies spaced apart from each other at a cutting section of the saw blade and pressing on the interior side of the saw blade without an exterior counter part to arrange a cutting section of the saw blade offset and parallel to a tangent plane to the pulley wheels of the band saw. The band saw is a large band saw of the kind that need the saw blade to be kept under tension during cutting, and where guide block assemblies are provided on just one side of the saw blade. Within the scope of the present invention the band saw is controlled from one side only. Two-sided control is only performed if no tensioning and stretching of the saw blade is required for a band saw, thus only for small band saws.

To illustrate the many differences between small and large band saws, some different properties, distinguishing features and requirements are listed below:

|  | Small band saws | Large band saws |
| --- | --- | --- |
| Use | Joineries, manufacturing of pieces of furnitures | Sawmills, planning mills, re-saw mills. |
| Conveying of objects to be cut | Manual | Automatic |
| Motor size | Below 15 kW | Above 20 kW, typically 20 kW-110 kW |

|  | Small band saws | Large band saws |
| --- | --- | --- |
| Diameter of pulley wheels | Below 900 mm | Typically 1000-2500 mm |
| Pulley wheel type, lubrication and cleaning of same | Wheels often with rubber or cork bandages and brushes to keep wheels clean. No lubrication | Crowned steel pulley wheel Scraper to clean pulley wheels, and lubrication to reduce friction |
| Saw blade width | 4-60 mm, no tension of saw blade, set teeth. | 80-360 mm, tensioned saw blade, Stellite ® tipped bandsaw blades, or swaged teeth. |
| Cutting speed | 200-2400 m/min. | 1800-6000 m/min |
| Blade control | The saw blade is guided and controlled on both sides of the saw blade, thus doublesided blade control. Minimum contact between blade guide and blade. | Control and tensioning applied from the interior side of the endless saw blade by means of blade guide assemblies, - thus one-sided blade control. The cutting section is offset the plane parallel to saw blade and including the tangent to both pulley wheels, One guide block assembly is situated above the object to be cut and a second guide block assembly is situated below the object to be cut, this in-between the blade guide assemblies a cutting section is delimited. |

Other examples of small band saws than the Felder and Hammer machines are the band saws of Holzmann, e.g. the Holzmann Band saw series HBS 230-810.

As examples of large band saws and sawmills can be mentioned AKE SAWMASTER, LOGMASTER and MILL-MASTER all obtainable from Söderhamn Eriksson AB, Västgötavägen 5, SE-826 40 Söderhamn. The Millmaster HPS 1500 is an example on a heavy high-speed sawing machine that has saw blade tensioned with 12 tons. The guide block assemblies of the present invention can easily be implemented in any of these known band saws and saw mills.

The present invention further relates to a thrust slat for the guide block assembly described above.

A preferred thrust slat that mates with the front part of the guide block assembly of the present invention may have an H-shaped cross-section.

Opposite longitudinal walls of the thrust slat advantageously expose longitudinal thrust faces to the saw blade to maintain control of the saw blade during cutting, keep the saw blade as steady as possible, and in particular to keep the offset of the saw blade within acceptable tolerances for a selected period.

Inbetween said longitudinal walls a plurality of cooling channels can be provided to remove frictional heat in response to creation of such heat, thereby prolonging life time of a thrust slat before it is worn and accordingly to its replacement or turning, which again has the consequence of an highly improved cutting process, both in view of operation time and cost. Thus, even through the thrust slat with cooling channels is made of substantially less goods than a solid thrust slat or than a known thrust block, it is more profitable to use. An important further feature of the cooling channels is that said cooling channels also serve to cool the saw blade.

A thrust slat must never be worn to the extent that the cooling channels become open into a longitudinal wall. Therefore it may be advantageously that the thrust slat has wear indication means to be able to visually inspect and detect when it must be replaced, or in the alternative turned, so that a not worn thrust face becomes the saw blade engaging face of the thrust slat.

The wear indication means can be selected from an impression, a depression or a recess provided in the longitudinal thrust face, preferably provided at a location on the respective longitudinal thrust face known to be the most subjected to wear.

BRIEF DESCRIPTION OF THE DRAWINGS

The invention will be described below with references to the drawing that shows exemplary embodiments of the invention.

FIG. 6 is a transparent perspective view of a rear part of a second embodiment of a mounting part for a guide block assembly of the present invention, FIG. 8 is a comparative principle sketch of the curvature of an offset saw blade of a vertical bands saw when the saw blade passes the thrust parts of two opposite guide block assemblies, FIG. 9a shows a principle sketch of the tensioning of a saw blade when it passes a known guide block assembly, FIG. 9b shows a principle sketch of the tensioning of a saw blade when using a higher guide block assembly than seen in FIG. 9a, FIG. 9c shows a principle sketch of the tensioning of a saw blade when it passes a guide block assembly of the present invention.

Figure 1:
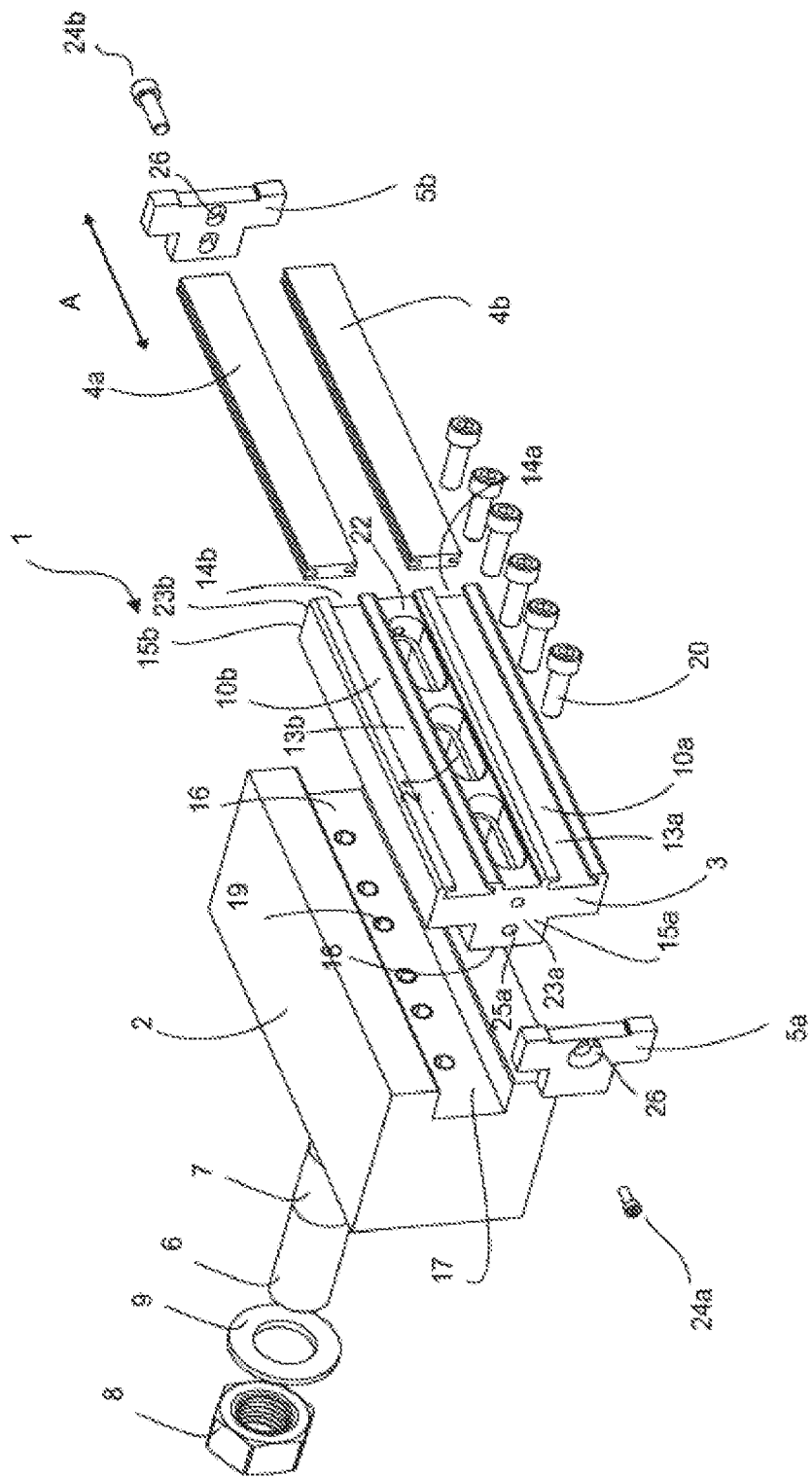
FIG. 1 is an exploded perspective view of a first embodiment of a guide block assembly of the sandwich type according to the present invention.

The embodiments of guide block assemblies shown in the drawings are described by reference to the orientation shown in the drawing. This orientation should not be construed as limiting, and the guide block assembly can be used in any possible position wherein the thrust part can be placed in contact with the offset saw blade to control its tensioning.

DETAILED DESCRIPTION OF THE INVENTION

Emphasis is made that for the examples of embodiments described below the guide block assemblies are shown and described as having two separate main components, a front part and a rear part. Within the scope of the present invention, the front part and the rear part can however also be an integral unit. The rear part may alternatively simply be constituted by the part of the front part facing the frame of the band saw. Thus the part of the front part, or of an integral unit, not facing the saw blade functions as the rear part.

The band saw for use with the guide block assembly is used on one side of the saw blade of a large band saw.

Figure 2:
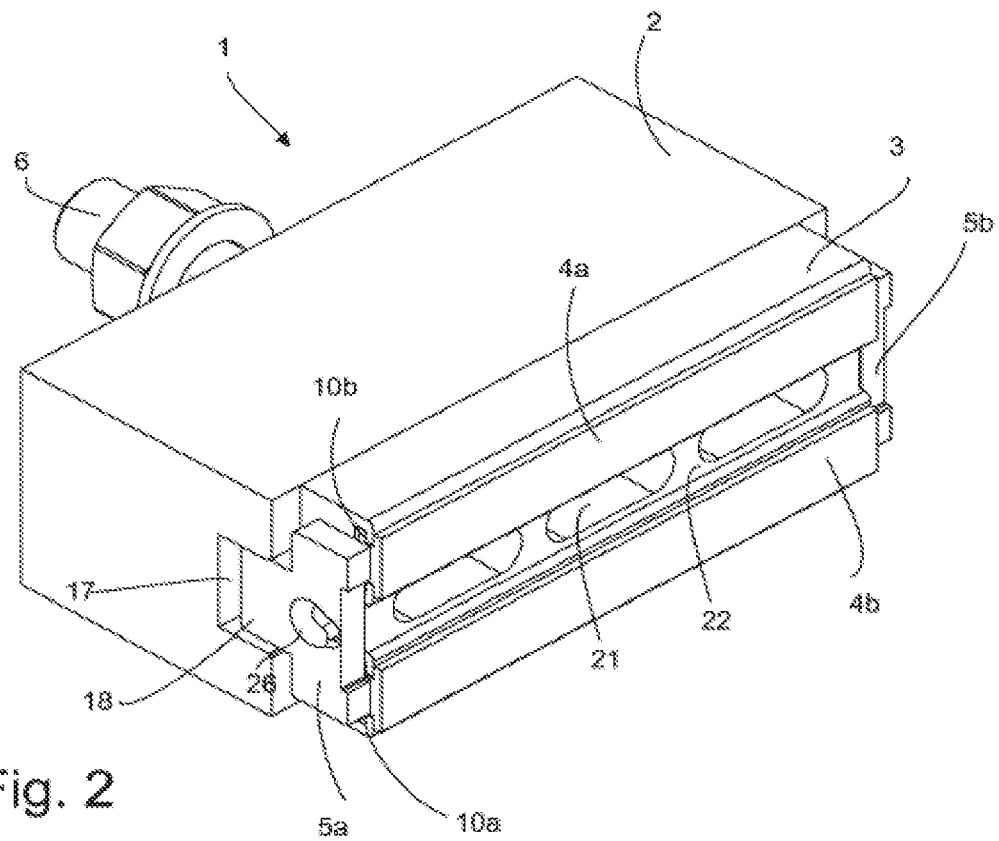
FIG. 2 shows the same in assembled state oblique from above.
Figure 3:
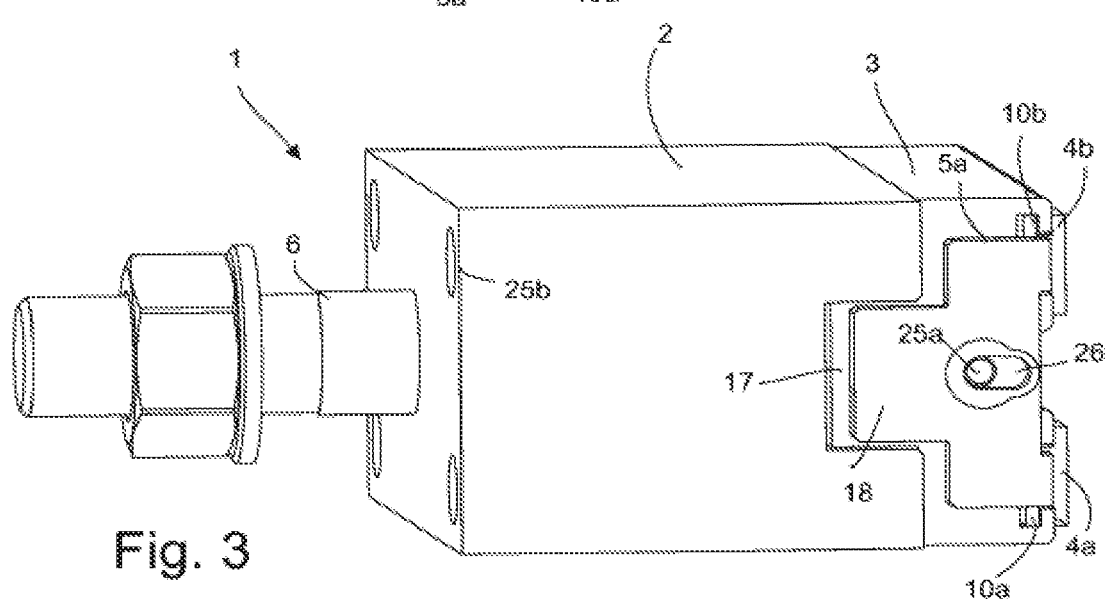
FIG. 3 shows the guide block assembly of FIG. 5 seen from the end face.

FIG. 1 is an exploded view of a first embodiment of a guide block assembly 1 of the present invention. FIG. 2 shows the same in perspective seen from above and in assembled state, and FIG. 3 is an end view of the same. In figs. 2 and 3 the fasteners, such as screws and bolts, seen in FIG. 1 have been left out to better visualize the core components.

The first embodiment of a guide block assembly 1 comprises the main components: a rear part 2, a front part 3, two thrust slats 4a,4b in accordance with a first embodiment of a thrust slat of the present invention, and end stops 5a,5b having a planar outline corresponding substantially to the cross-section of the front part 3, in the present embodiment a substantial T-shaped outline and cross-section. The guide block assembly 1 has a rod coupling 6, which in the present case may correspond substantially to the rod coupling of the prior art, thus having a rod 7, a nut 8 and a washer 9. The guide block assembly 1 may however within the scope of the present invention be secured to the frame of the band saw in any other suitable manner. In an embodiment without a rear part 2 the front part 3 can even be directly secured to said frame.

The guide block assembly 1 of the present invention utilizes spaced apart thin flat thrust slats 4a,4b instead of the large solid thrust part or large flat thrust plate, that the prior art of guide block assemblies hitherto has utilized and deemed essential to avoid accumulations of residues from the milling process entering the guide block assembly, such as e.g. saw dust and resins, and residues and debris from the thrust component.

The thin thrust slats 4a,4b are inserted in corresponding receiving means in form of respective parallel grooves 10a,10b configured to keep the thrust slats 4a,4b secured to the front part 3 when the saw blade runs during the cutting process. In the present embodiment the grooves 10a,10b have a substantial C-shape in cross-section and the thrust slats 4a,4b are substantially H-shaped in cross-section so that the free ends 11a',11b';11a",11b" of the C, defined by free elongate edges, fit into the gaps 12a',12b';12a",12b" between the legs of the H from above and from below respectively, as seen best in FIG. 4.

The C-shape provides a groove 10a,10b with a bottom 13a,13b that is wider than the opening 14a,14b, so that when a thrust slat 4a,4b is inserted or withdrawn by sideways sliding into or out of the groove 10a,10b, as indicated by double-pointed arrow A, from one of the end faces 15a,15b of the front part 3, while at least one of the end stops 5a,5b is dismantled, the thrust slat 4a,4b cannot drop out of the groove 10a,10b. A thrust slat 4a,4b may be slightly shorter than its groove 10a,10b to allow absorption of frictional energy and provide space from dimensional change due to frictional heating. For example if the thrust slat 4a,4b is 165 mm the groove 10a,10b can e.g. be 0.1 mm longer.

The rear part 2 has a first coupling profile 16, in form of a longitudinal rear groove 17, that faces towards a mating protruding second coupling profile 18 of the front part 3. In the present exemplary embodiment the rear groove 17 has a simple square or rectangular profile that fits together with a corresponding square or rectangular profile of the second coupling profile 18, so that the female second coupling profile 18 easily can be introduced in the first coupling profile 16 in a movement co-axial with the axis of the rod 7 or by sideways movement in the direction of the arrow A, whatever is the most convenient. The first coupling profile 16 has first holes 19 to receive first fasteners 20 that pass through second holes 21 in a center section 22 of the front part 3 between the grooves 10a,10b, which center section 22 includes the second coupling profile 18.

In the present exemplary embodiment of a guide lock assembly 1, three elongate second holes 21 through the center section 22 receive the first fasteners 20, such as six bolts or screws, two through each elongate through-going second hole 21. The first fasteners 20 are secured in the second holes 21 to assemble the rear part 2 and the front part 3 with or without the thrust slats 4a, 4b, and while the rear part 2 is mounted to the band saw or not.

When the thrust slats 4a,4b have been inserted in their respective grooves 10a,10b, the end stops 5a, 5b are mounted to the respective end faces 23a,23b of the front part 3 by means of second fasteners 24a,24b, such as screws, through third holes 25a in the end face 23a,23b of the front part 3 and fourth holes 26 in the end stops 5a,5b, to close the ends of the grooves 10a,10b and confine, optionally retain, the thrust slats 4a,4b inside said grooves 10a,10b.

Figure 4:
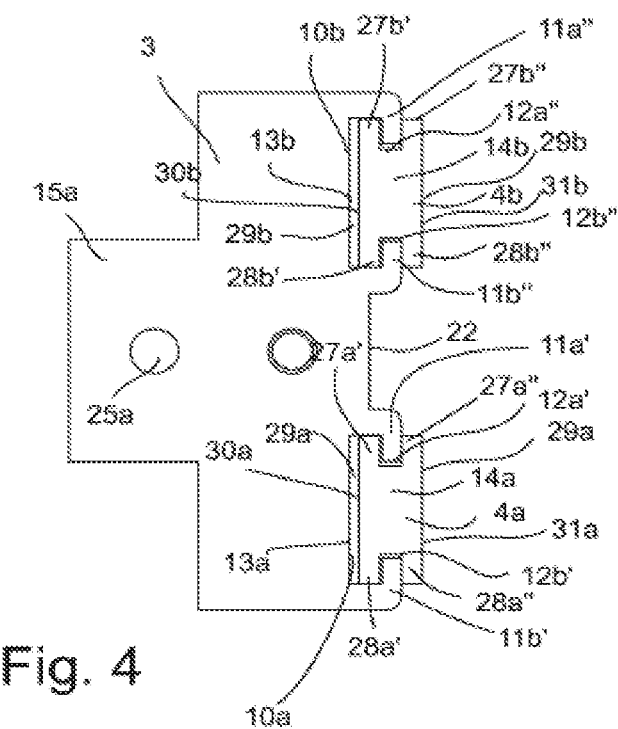
FIG. 4 is an end view of the front part with two mounted thrust slats of a first embodiment of a thrust slat.
Figure 5:
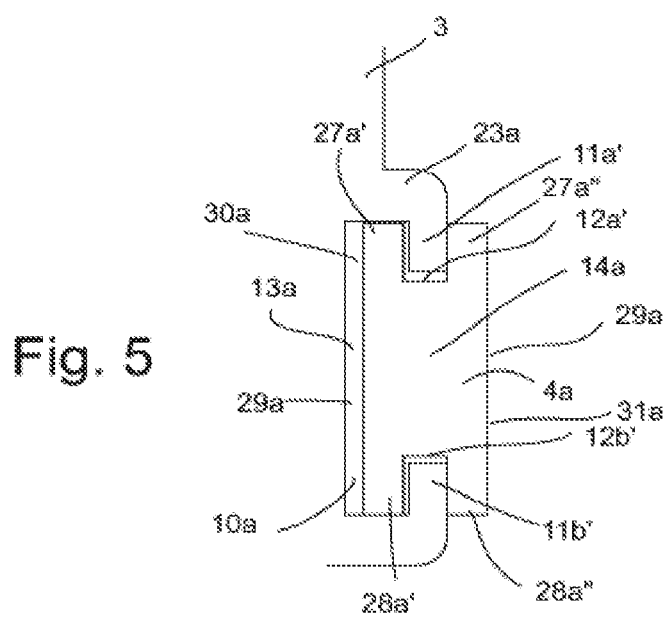
FIG. 5 is an enlarged scale view of the lower groove with the lower thrust slat of the first embodiment of a thrust slat.

The engagement between the H-shaped profile of the thrust slats 4a,4b and the C-shaped grooves 10a,10b is seen better in the enlarged scale end view of FIG. 4 of the front part 3 with mounted thrust slats 4a,4b, and in the further enlarged fragment of FIG. 4 seen in FIG. 5 of the lower C-shaped groove 10a with corresponding inserted lower thrust slat 4a.

The C-shape of the lower C-shaped groove 10a terminates in bend opposite facing free edges and free ends 11a',11b' the distance between which delimits the opening 14a that is narrower than the width of bottom 13a of the groove 10a. The bend opposite facing free upper end 11a' and free lower end 11b' of the lower groove 10a mates with, and is accommodated in, a corresponding upper gap 12a' and lower gap 12b', respectively, between opposite respective inner and outer legs 27a',27a";28a',28a" of the H-shaped thrust slat 4a. Similarly the C-shape of the upper C-shaped groove 10b terminates in bend opposite facing free ends 11a",11b" the distance between which delimits the opening 14b that is narrower than the width of the bottom 13b of the groove 10b. The bend opposite facing free upper end 11a" and lower end 11b" of the upper groove 6b mates with and is accommodated in a corresponding upper gap 12a" and lower gap 12b" between opposite respective inner and outer legs 27b',27b"; 28b',28b" of the upper H-shaped thrust slat 4b. The above referred "widths" corresponds to the heights of the respective grooves 10a,10b when using the orientation of figs. 4 and 5. Further the term "free end" in relation to the C-shaped grooves 10a,10b and H-shaped thrusts slats is used in relation to the elongate free edges of these profiles.

As seen best in figs. 4 and 5 the thickness of a thrust slat 4a,4b is preferably selected so that a thrust slat 4a,4b does not rest on the bottom 13a,13b of the groove 10a,10b. Thus there is preferably a free space 29a,29b left between the bottom 13a,13b of the groove 10a,10b and the inner legs 27a',28a';27b',28b' of the H-shaped thrust slats 4a,4b. This free space 29a,29b preserve the interior face 30a,30b of the thrust slat 4a,4b, thus the face 30a,30b of the thrust slat not being in operative contact with the saw blade, from being worn, so that this interior face 30a,30b can be used as the outer face 31a,31b of the thrust slat 4a,4b later.

When the guide block assembly 1 is mounted on the band saw the exterior legs 27a",28a",27b",28b" of the H-shaped thrust slats 4a,4b is in abutting contact with the exterior face of the free ends 11a',11b';11a",11b" of the receiving means 10a,10b of the front part 3 and is subjected to an additional pressure force by the orbiting saw blade towards said exterior face of the free ends 11a',11b';11a",11b" of the grooves 10a,10b when the saw blade is in operation.

The saw blade presses against a thrust slat 4a,4b towards the front part 3 but the thrust slat 4a,4b is not thicker than a space is left to prevent wear on the face of a thrust slat 4a,4b not in contact with the saw blade.

FIG. 6 is a transparent perspective view of a second embodiment of a rear part 32 of a modified guide block assembly 1 of the present invention. The second embodiment of the rear part 32 corresponds substantially to the first embodiment of a rear part 2, and for like part same reference numerals are used. Transparency is applied to FIG. 6 only to visualize the intake manifold 33. Rather the rear part 32, the front part 3 and the thrust slats 4a,4b are all solid parts.

The second embodiment of the rear part 32 differs from the first embodiment of a rear part 2 in that it has an embedded intake manifold 33 for distributing a flow of e.g. a lubricating agent, a coolant agent, and/or a cleaning agent.

The intake manifold 33 has an inlet 34 in one or both end faces 35a,35b. The inlet 34 of the intake manifold 33 communicates with a central fluid channel 36 that divides into three delivery pipes or delivery channels 37a,37b,37c with respective outlets 38a,38b,38c that end in the second holes 21 at the center section 22 for delivering a suitable agent between the thrust slats 4a,4b, in order to treat the saw blade (not shown) with said agent. More or less delivery pipes or delivery channels may be provided along the longitudinal rear groove 17, e.g. spaced from and aligned with the first holes 19.

The rod coupling 6 allows the guide block assembly 1 to be rotated into correct position in relation to the saw blade, irrespective of any other features of the guide block assembly and of the band saw, and irrespective of the rear part being part of an integral unit or is constituted by the back of the front part. Fifth holes 25b, e.g. circular or elongate fifth holes, may be provided on the rear part 2,32, which fifth holes are adapted to be coupled to suitable means on the frame of the band saw, such means e.g. being tailstock screws, to further adjust the degree and position of engagement between the band saw and the saw blade, and thus adjusting the tensioning of said saw blade.

Figure 7:
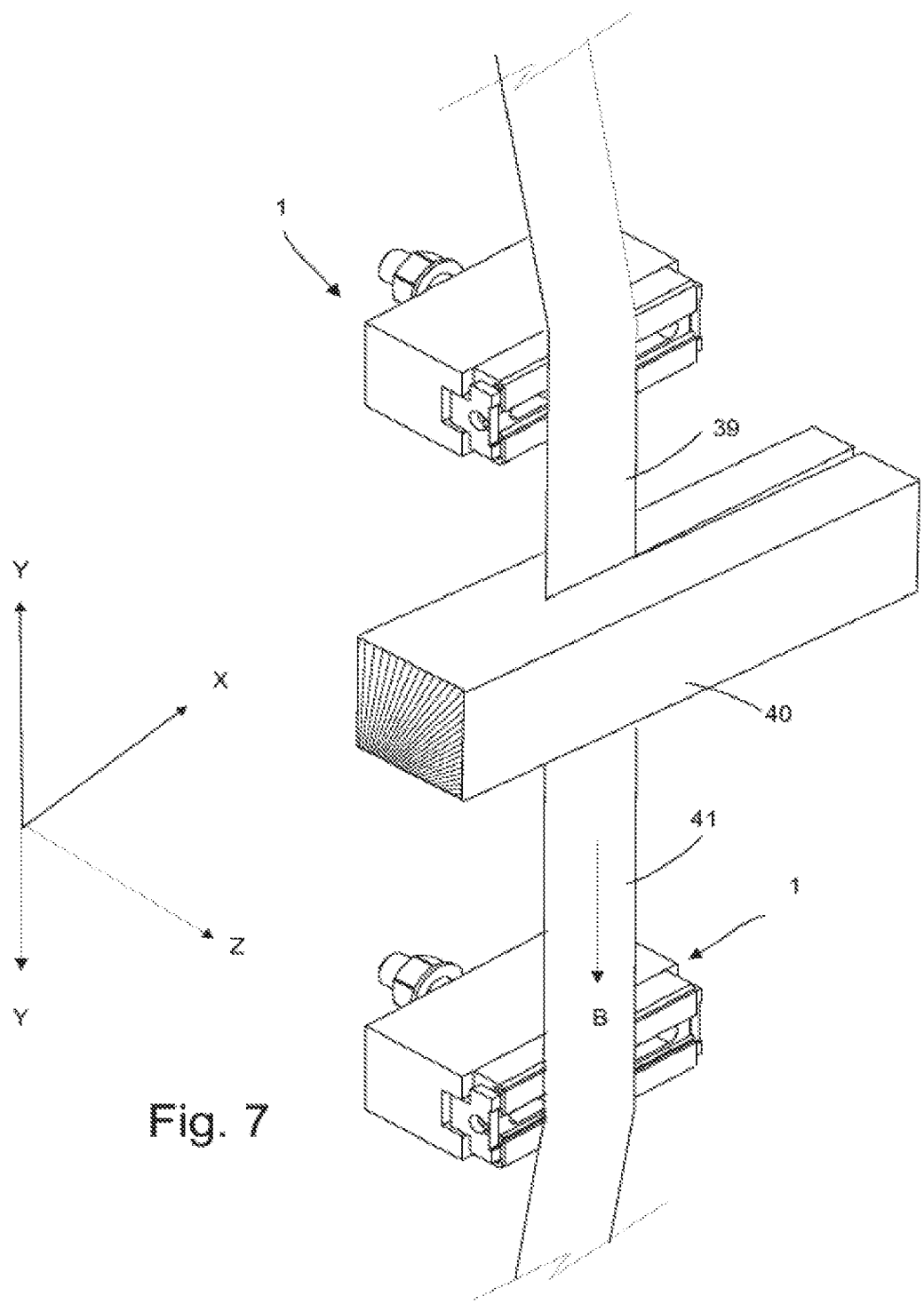
FIG. 7 shows two guide block assemblies mounted to distend a section of a saw blade during cutting a workpiece.

FIG. 7 shows two guide block assemblies 1 mounted to distend a section of a fragment of a saw blade 39 during cutting a workpiece 40 so that the cutting section of the saw blade is kept optimum stretched and tensioned. The saw blade 39 is offset the pulley wheels of the band saw (not shown) and has teeth (not shown). The saw blade 39 moves in the Y-direction, indicated by arrow B, to cut the workpiece 40 that moves in the X-direction. It should be noted that any kind of workpiece can be cut with the band saw, which has been provided with the guide block assemblies of the present invention. The workpiece 40 shown in FIG. 7 is only shown by way of example, and should not be construed as limiting the usability and options of the present invention.

As seen in the principle sketch of FIG. 8, during the cutting the saw blade 39 of a vertical band saw 44 orbits around the upper pulley wheel 42, the idle pulley wheel, and the lower pulley wheel 43, the drive pulley wheel. The guide block assemblies 1a,1b keep the saw blade 39 tensioned with an offset 45 in the Z-direction and substantially free of vibrations at the section 41 of the saw blade 39 between the opposite guide block assemblies 1, the cutting section 41. The section 41 of the saw blade 39 is thus offset from the tangent plane T to the pulley wheels 42,43.

The principle sketches of figs. 9a-c show tensioning of the saw blade when it passes a known guide block assembly, and a guide block assembly of the present invention.

In FIG. 9a the saw blade is arranged in the offset position by means of a conventional guide block assembly with a thrust plate, as indicated by the dotted box. The saw blade is subjected to very abrupt breaks at the transit of the known guide block assembly, and keeping the saw blade straight between the outmost contact edges of the known guide block assembly and close to the workface of the thrust plate is almost impossible even when the offset is set high. The radius of curvature of the tensioned saw blade may e.g. be about 10 m for this conventional guide block assembly set-up.

FIG. 9b shows an off set saw blade of a large band saw in a set-up that resembles the set-up shown in FIG. 9a. The guide block assembly is however made higher to illustrate the effect of a change of curvature of the transiting saw blade, in that the breaks of the saw blade at the transit of the guide block assembly are less abrupt. A 20-50% higher guide block assembly may e.g. result in that the radius of curvature of the tensioned saw blade is increased to a length of up to about 15 m in this modified guide block assembly set-up.

The radii given in relation to figs. 9a-c are only given as examples, and other radii are possible for other set-ups.

Figure 10:
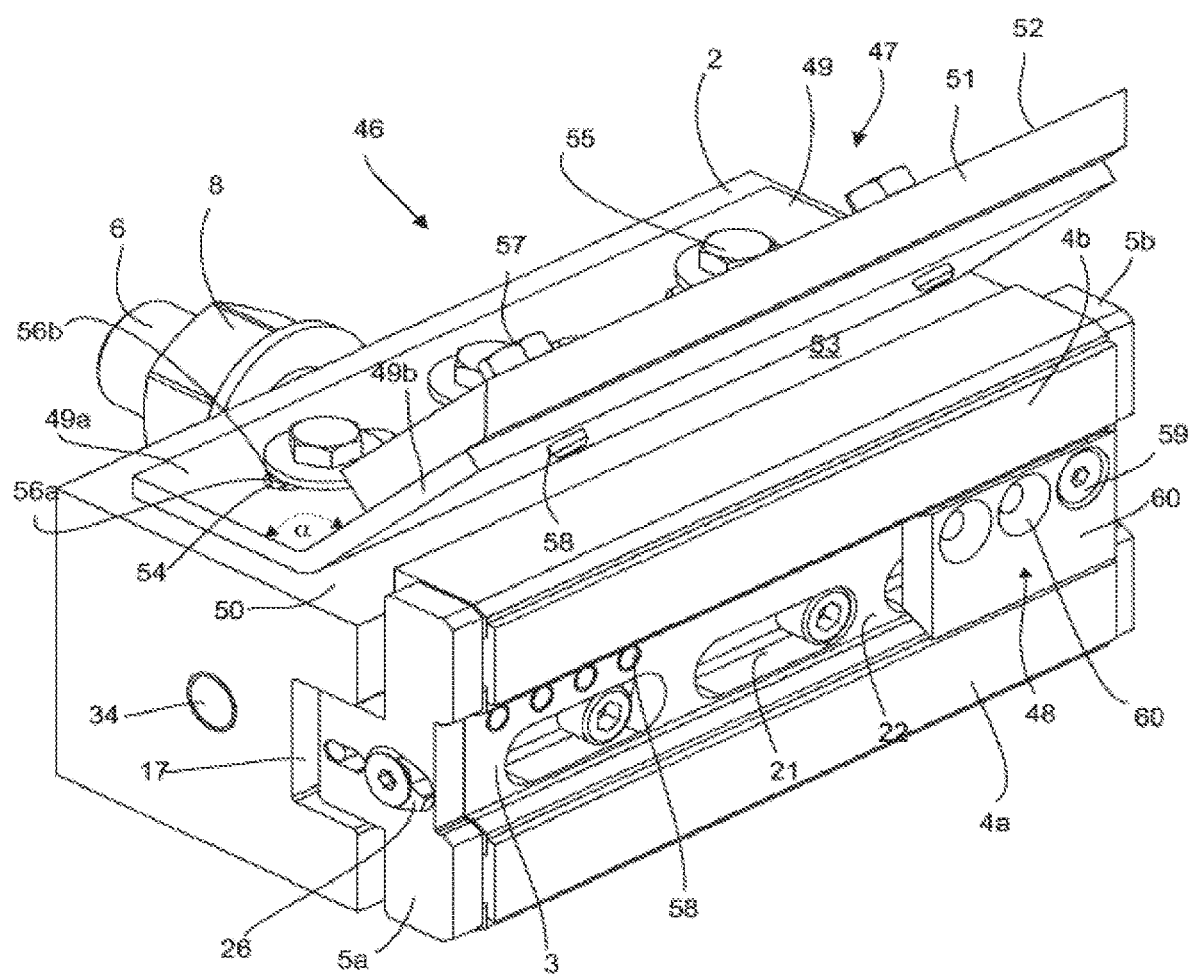
FIG. 10 is a perspective view of a third embodiment of a guide block assembly of the present invention seen oblique from the front.
Figure 11:
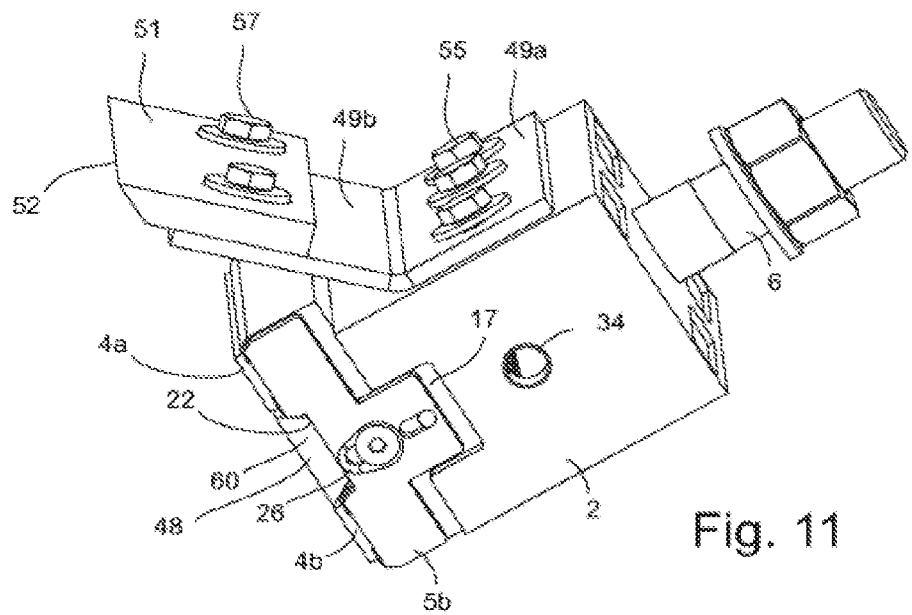
FIG. 11 shows the same seen from the short end.
Figure 12:
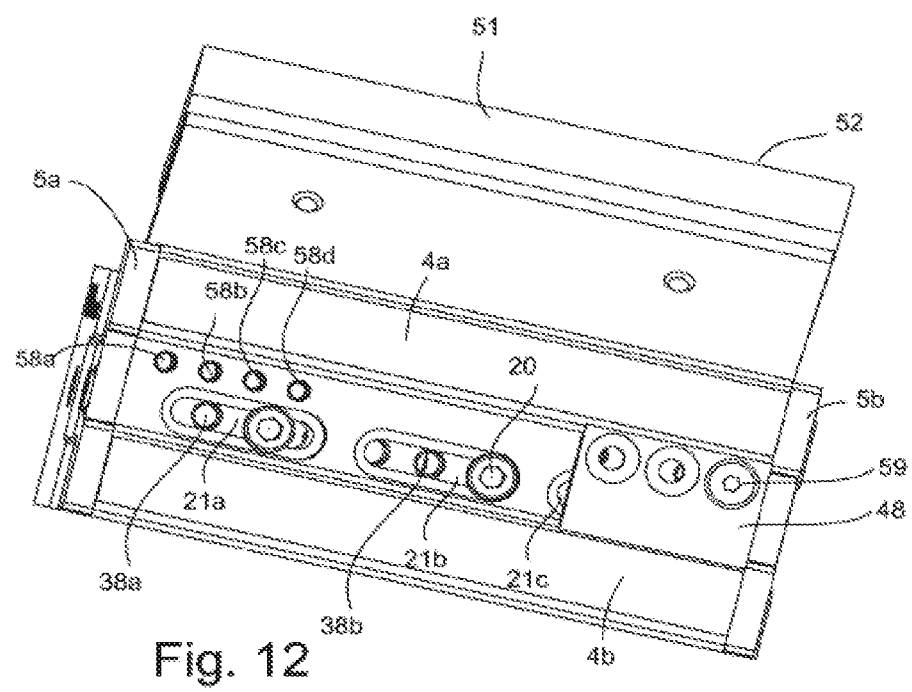
FIG. 12 shows the same seen from the front.

FIG. 10 is a perspective view of a third embodiment of a guide block assembly 46 of the present invention seen oblique from the front. FIG. 11 shows the same seen from the short side and FIG. 12 shows the same seen from the front. The third embodiment of a guide block assembly 46 corresponds substantially to the first and second embodiments of a guide block assembly of the present invention and for like parts same reference numerals are used.

The third embodiment of a guide block assembly 46 differs mainly in that the guide block assembly 46 is provided with a blade scraper component 47 and a fluid guiding component 48. Emphasis is made that both just one of the blade scraper component 47 and the fluid guiding component 48 may be required. Which one, if any at all, depends on the cutting task. Further difference between the third embodiment of a guide block assembly and the first and second embodiment of a guide block assembly is that the front part is higher so as to obtain a higher combined thrust surface. Also the end stops 5a,5b are higher to keep the opposite lengthwise extending thrust slats 4a,4b confined inside the respective receiving means.

The blade scraper component 47 includes an angle brace 49 having a first leg 49a secured to the top face 50 of the rear part 2, and a second leg 49b protruding at an angle α from the first leg 49a towards and above the outer face 31a,31b of the thrust slats 4a,4b, using the orientation seen in figs. 10 and 11. The second leg 49b carries a scraper 51 that has a scraper edge 52, such as a beveled scraper edge, facing the saw blade 39 for in use scraping off undesired matter from the running saw blade 39. A free space 53 is thus provided by the angle brace 49 between the upper thrust slat 4b and the scraper edge 52.

The position of the blade scraper component 47 on the top face 50 of the rear part 2;32 is laterally adjustable along the width of the rear part 2;32 due to elongate sixth holes 54 in the first leg 49a. Accordingly, the optimum position of the blade scraper component 47 on the rear part 2;32 can be achieved by providing third fasteners 55, e.g. screws, and securing said third fasteners 55 in the elongate sixth holes 54 and seventh holes 56a in the rear part 2;32. In a similar manner can the scraper 51 be secured, optionally laterally displaceable (not shown), by means of fourth fasteners 57 into eight holes 56b in the second leg 49b.

The fluid guiding component 48 is in the present embodiment a dove-tailed wedge body inserted in the center section 22 lengthwise offset towards an end stop 5b to guide the ejection of fluid agent through one or more of the outlets 38a,38b,38c depending on the position and length of the fluid guiding component 48. The fluid guiding component 48 is secured to ninth holes 58 provided at the center section 22 of the front part 3 by means of countersunk fifth fasteners 59 through tenth holes 61 in the fluid guiding component 48 itself. As seen best in FIG. 11 the front face 60 of the fluid guiding component is retracted from the thrust faces, i.e. the outer face 31a,31b of the thrust slats 4a,4b so that this front face cannot interact with the saw blade. Four ninth holes 58a,58b,58c,58d are provided at each side of the center section 22 to provide various options for securing the fluid guiding component 48 in a selected position. Only the ninth holes 58a,58b,58c,58d to the left in FIG. 10 an 12 can be seen in FIG. 10 an 12. The ninth holes 58a,58b,58c,58d to the right is hidden behind the fluid guiding component 48. No fluid is ejected through the ninth holes 58a,58b,58c,58d, which ninth holes 58a,58b,58c,58d are provided for securing purpose of the fluid guiding component 48. The ninth holes 58a,58b,58c,58d are not in fluid communication with the manifold.

As seen best in FIG. 12 the first outlet 38a, the second outlet 38b, and the third outlet 38c end in respective second holes 21a,21b,21c at the center section 22 for delivering a suitable agent, such as air, between the thrust slats 4a,4b, in order to treat the saw blade (not shown) with said agent, e.g. to blow away residues from the cutting operation in the direction towards the teeth of the saw blade and past the teeth of the saw blade. The fluid guiding component 48 is arranged partly above the third outlet 38c so that fluid can pass out of the second hole 21c between the thrust slats 4a,4b in the direction to the left in FIG. 12. The second outlet 38b is not shielded or blocked and thus also open. Air is suitable as the fluid agent that is ejected via one or more of the outlets 38b,38c, as shown in the embodiment in FIG. 12, however depend depending on where the fluid guiding component 48, if used, is mounted any of the outlets 38a,38b,38c can be open, and any of the outlets 38a,38b be shielded. In the configuration shown in FIG. 12 fluid is ejected via the third outlet 38c and guided to the left in FIG. 12 to assist the fluid coming from the second outlet 38b to keep the center section 22 between the opposite thrust slats 4a,4b free of matter and residues created during the cutting process. No fluid can flow to the right along the center section 22 in the third embodiment of a guide block assembly shown in figs. 10 and 12 but is directed to the left past the teeth of the saw blade (not shown) and thus opposite the cutting direction. The first outlet 38a is otherwise blocked or shielded, and no fluid is ejected via this first outlet 38a. Arranging the fluid guiding component 48 to the left in FIG. 12 will provide a similar arrangement but with a flow of fluid to the right. The fluid blocking component 48 can even be more or less protruding beyond the center section 21, so that the opening at the short end of said center section 21 is just blocked and the outlet 38c fully free to eject fluid.

Instead of using the high solid thrust block or high thrust plate seen in FIG. 9b, which would generate a lot of heat when the saw blade pass over, the same or better thrust effect is achieved by the present invention by using spaced apart opposite thrust slats, as illustrated in principle in FIG. 9c, with the further advantage that less heat is developed. Furthermore, since the thrust slats can be made much lower they cannot bulge as the restrained larger thrust plates of the prior art. So the thrust slat for use in the present invention can be made as thin as the known thrust plate id desired, and even thinner as well. The height of the workface are the same as shown in FIG. 9b, while the actual workface, which is subjected to wear is the same as shown in FIG. 9a. This innovative design results in that stress on the saw blade and the development of heat is heavily reduced, in particular due to the straightening of the saw blade and the less abrupt transit of the saw blade when it pass over the guide block assembly of the present invention.

Figure 13:
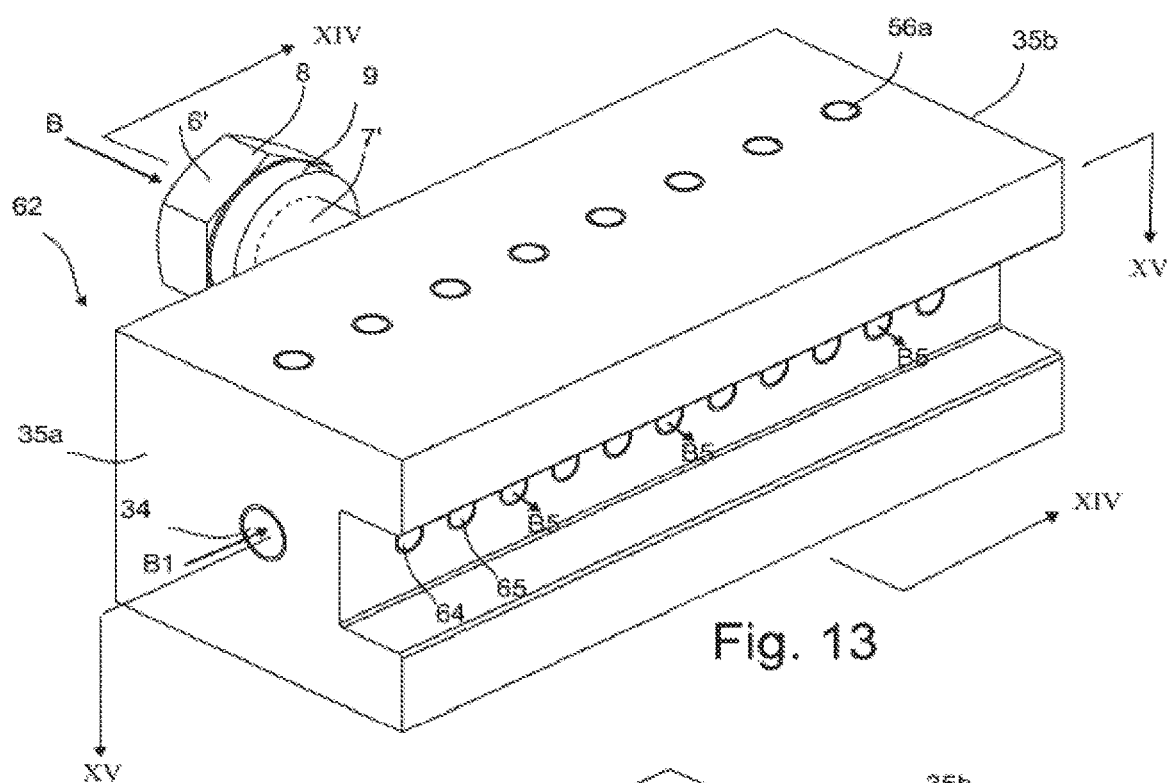
FIG. 13 shows a third embodiment of a rear part for the guide block assembly of the present invention seen oblique from the front.
Figure 14:
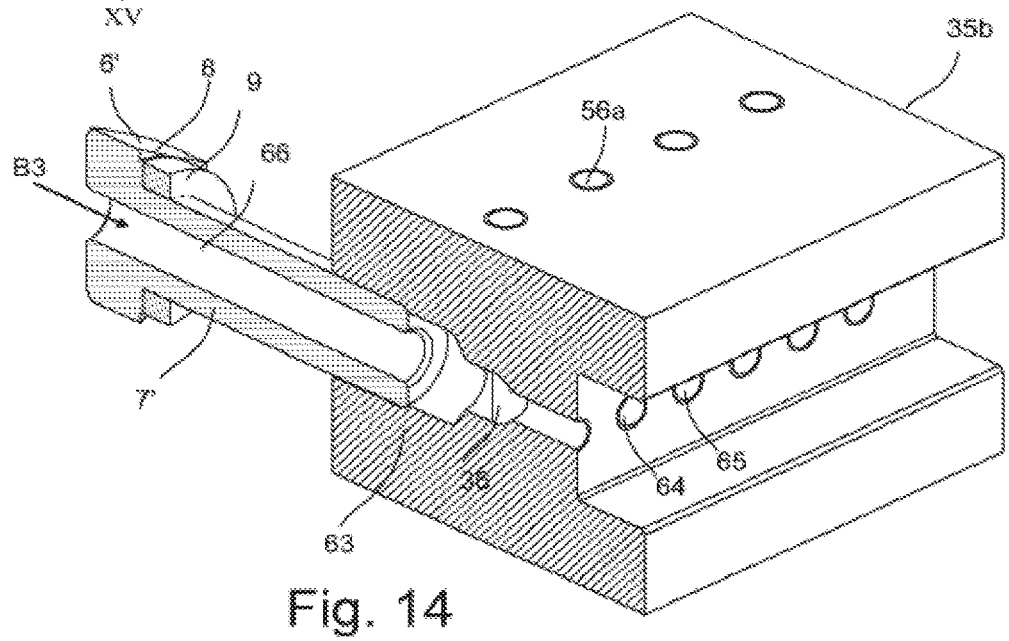
FIG. 14 is a sectional taken along line XIV-XIV in FIG. 13.
Figure 15:
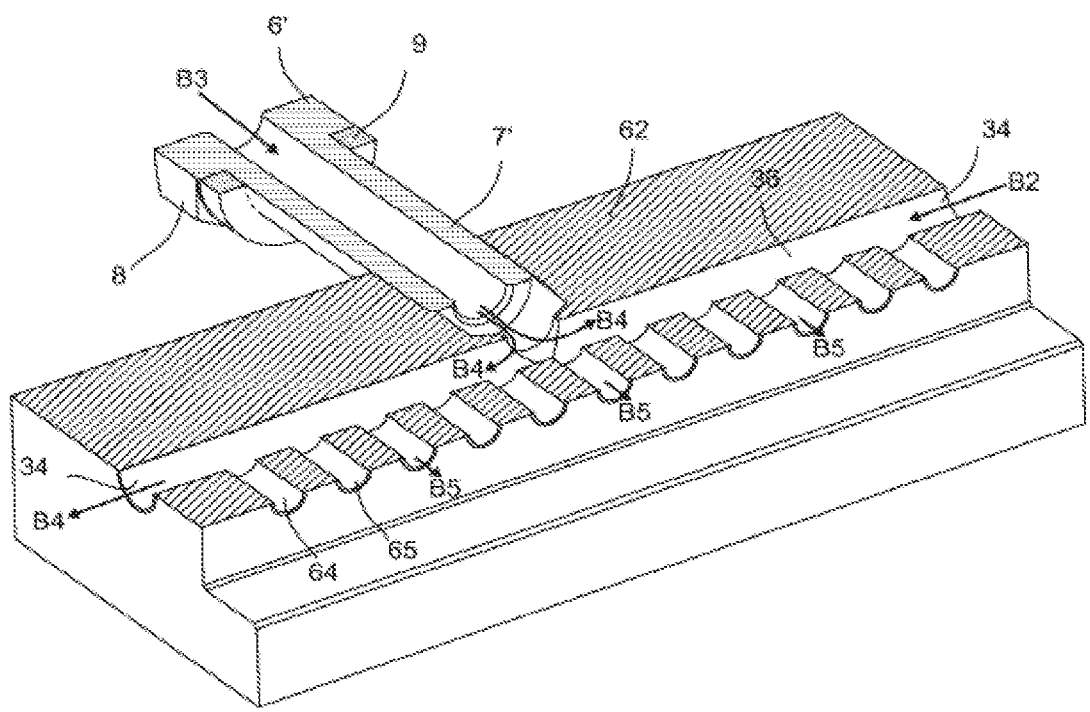
FIG. 15 is a sectional taken along line XV-XV in FIG. 13.

FIG. 13 is a perspective view of a third embodiment of a rear part 62 of a modified guide block assembly of the present invention, and figs. 14 and 15 show corresponding sectional views. The third embodiment of the rear part 62 corresponds substantially to the second embodiment of a rear part 32, and for like parts same reference numerals are used. The third embodiment of a rear part 62 differs mainly from the second embodiment of a rear part 32 in having a modified embedded intake manifold 33 for distributing a flow of e.g. a lubricating agent, a coolant agent, and/or a cleaning agent. The third embodiment of a rear part 62 can be used in combination with any of the front parts and thrust slats otherwise described in the present application. Furthermore, the third embodiment of a rear part 62 is adapted, just as the third embodiment of a guide block assembly 46, to be equipped with a blade scraper component 47, as shown in e.g. FIG. 10. To that aspect the third embodiment of a rear part 62 also has seventh holes 56a for securing of third fasteners 55 for securing of the blade scraper component 47, similar to as shown in FIG. 10.

Just as the second embodiment of the rear part 32 the intake manifold 33 has an inlet 34 in one or both end faces 35a,35b for the flow of e.g. a lubricating agent, a coolant agent, and/or a cleaning agent, as indicated by arrows B1,B2. As seen best in the sectional view of FIG. 15 the inlet 34 of the intake manifold 33 communicates with a central fluid channel 36 that divides into eleven delivery pipes or delivery channels 64 with respective outlets 65 for delivering a suitable agent between the thrust slats (not shown) in order to treat the saw blade (not shown) with said agent.

A modified rod 7' of the rod coupling 6' has a throughgoing delivery bore 66 to also directly supply the central fluid channel 36 of the manifold 63 with the desired agent, as indicated by arrow B3, and distribute it into the central fluid channel 36 as indicated by curved arrows B4, and distribute further into delivery pipes or delivery channels 64, as indicated by arrows B5 for some of said delivery pipes or delivery channels 64. The agent leaves the rear part 62 via the respective outlets 65 of the delivery pipes or delivery channels 64 to reach a target, such as e.g. the saw blade and optionally also the thrust slats in front of the rear part 62.

It should be noted that the agent can be supplied via one or both of the opposite inlets 34 and via the through going bore 66 of the rod 7' at the same time or via just one of those. Although just three arrows B5 are indicated in FIGS. 13-15 it is understood that the relevant agent can exit any of the respective outlets 65, which are free.

The embodiments shown and discussed above are all composed of individual components assembled to obtain the guide block assemblies of the present invention.

Emphasis is made that except for the end stops, the thrust slats, the nut and the washer, the guide block assemblies can be an integral unit. As such a guide block assembly of the present invention can be made of a solid block of metal, e.g. by milling or laser cutting, or be molded, to provide the preferred design and structure. So one or more of the rear part, front part, rod of rod coupling, and even scraper and permanent fluid guiding component can be made as an integral unit.

Figure 16:
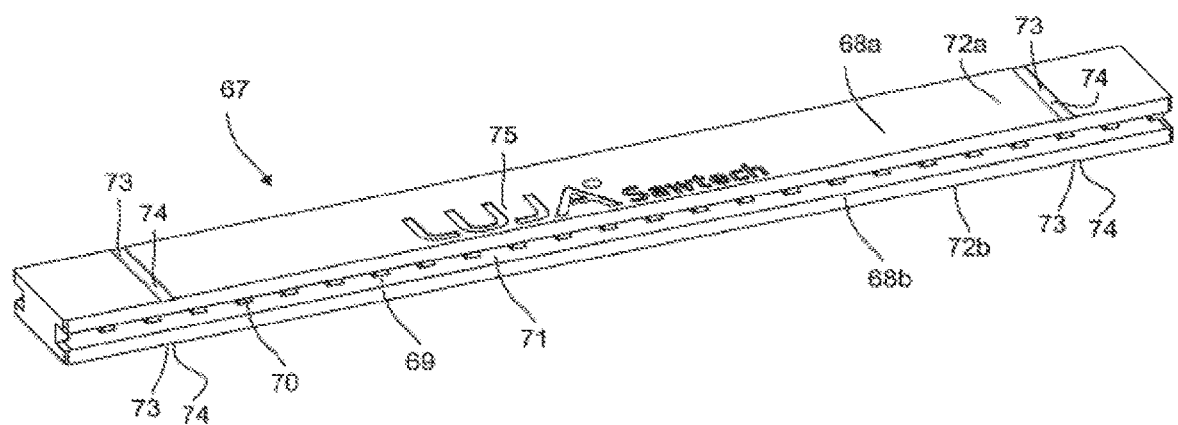
FIG. 16 is a perspective view of a second embodiment of a thrust slat of the present invention seen from one longitudinal thrust face.
Figure 17:
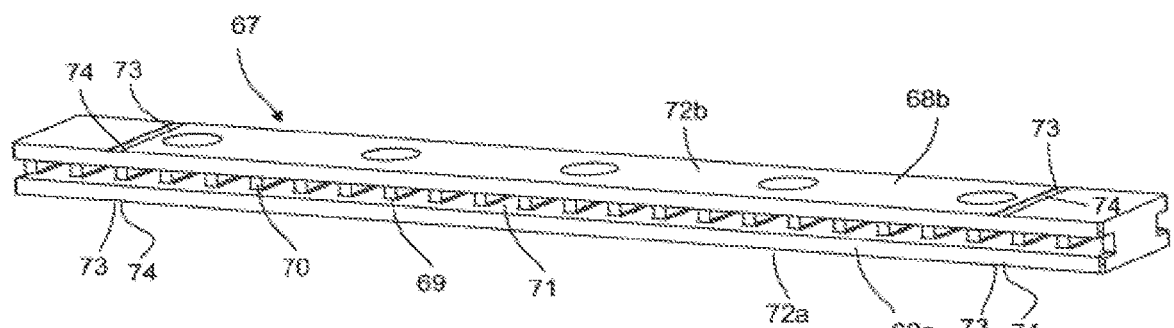
FIG. 17 shows the same seen from the opposite longitudinal thrust face.
Figure 18:
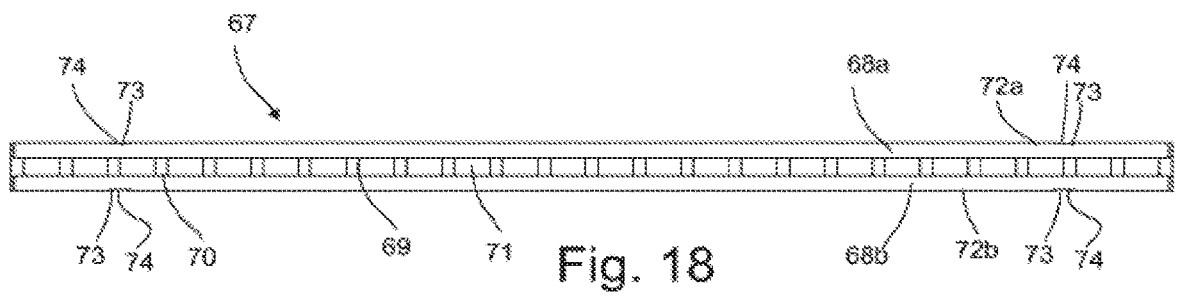
FIG. 18 shows the same seen from the legs of the H-shape, e.g. from the top or from the bottom.

FIGS. 16-18 show various views of a second embodiment of a thrust slat 67.

In contrast to the first embodiment of a thrust slat 4a,4b the second embodiment of a thrust slat 67 is not entirely solid.

The second embodiment of a thrust slat 67 has in general the same H-shaped profile as the first embodiment of the thrust slat 4a,4b and is used in the same manner as described for the first embodiment of a thrust slat 4a,4b.

The thrust slat 67 has opposite longitudinal walls 68a,68b at a distance from each other due to a plurality of spacer means 69, in the present embodiment rod-shaped spacer elements 70 arranged spaced apart along the length of the thrust salt 67, to obtain cooling channels 71 crosswise the width of the thrust slat 67. The rod-shaped spacer elements 70 are in the present embodiment, purely as an example, arranged with mutual distance and have same size to define a plurality of identical cooling channels 71. It should be noted that in the current exemplary embodiment the cooling channels 71 are arranged parallel to the parallel legs of the H-shaped cross-section of the thrust slat 62, however the cooling channels 71 can be arranged in any other direction, such as being skew, can be in fluid communication with each other, and/or be provided with different spacing. The parallel pattern of the spacer means 69 of rod-shaped spacer elements 70 can in the alternative be replaced by a pattern of smaller spacer elements 70, e.g. small squares of dots, so that the cooling channels 71 constitute a continuous cooling channel 71 or maze.

The cooling channels 71 can be e.g. created by drilling bores, or if the thrust slat 67 is made of plastic or of plastic composites, e.g. by injection molding or batch molding, the cooling channels 71 can be created directly during the molding process.

As for the first embodiment of a thrust slat 4a,4b the second embodiment of a thrust slat 67 has a first longitudinal thrust face 72a opposite a second longitudinal thrust face 72b, each of which can be used as the interior face 30a,30b or as the outer face 31a,31b of the thrust slat 67.

Any of the first longitudinal thrust face 72a and/or the second longitudinal thrust face 72b can be provided with wear indication means 73, e.g. an impression, depression or a recess 74, e.g. positioned at a location on the respective longitudinal thrust face 72a,72b known to be the most subjected location to wear during contact with the orbiting saw blade.

The wear indications means 73 can optionally include a logo 75 recessed in any of the first longitudinal thrust face 72a and/or the second longitudinal thrust face 72b, as indicated by the logo LUJA Sawtech. The logo may advantageously serve as evidence that the thrust slat comes from a qualified and trusted manufacturer, and that it is not a copy that might perform less safely. The wear indications means 73 can also be a recess 74 extending cross-wise on one or both of the first longitudinal thrust face 72a and the second longitudinal thrust face 72b, preferably from one exterior leg to another exterior leg of the H-shaped thrust slat 67. In the present exemplary embodiment the thrust slat 67 has four such recesses 74 symmetrically arranged on the first longitudinal thrust face 72a and the second longitudinal thrust face 72b, respectively, being retracted from the opposite free ends 76a,76b of the thrust slat 67. A recess 74 is typically located at one or both of that third part of the thrust slat closest to the free ends 76a,76b. A suitable depth of a recess 74 is between 0.03 mm and 3.00 mm, such as e g. between 0.1 mm and 0.3 mm.

Before or when the wear indication means 73 are no longer visual, thus when there the surface of a longitudinal thrust face is even with e.g. the recess 74, it is time to consider using a new thrust slat 67.

So the guide block assembly of the present invention has, despite the prejudice within the art, an area of the thrust face that faces the orbiting saw blade that is kept out of contact with the saw blade. The advantages of using a thin thrust slat instead of a thick heavy thrust block includes but are not limited to the fact that the overall dimensions of the guide block assembly can promptly be restored to previous conditions and settings. Re-tensioning and adjustment of the tension of the saw blade can be completely dispensed with, or at least be very minimal, because the saw blade tensioning and control of same take considerable less time than when a conventional guide block assembly are refitted with a thrust block, and the set-up of the guide block assembly can be standardized due to the thrust slat having substantially same dimensions and positions at all times.

So the thrust slats may come in standard sizes for a certain band saw so that the same dimensions easily are reinstated upon replacement of a used thrust slat. A further advantage is that replacement of a thrust slat is very fast because only a small part of the entire guide block assembly of the present invention needs to be handled. The guide block assembly needs not be dismantled at all from the band saw frame to replace the thrust slats. Band saw down time and tool costs are substantially reduced, and due to the less contact area with the saw blade also higher production speed due to higher running speed of the saw blade is achieved. The novel guide block assembly stabilizes the saw blade efficiently, so that vibrations and chattering are eliminated, development of heat is controlled better and less heat is developed even though the speed of the saw blade is very high to meet demands for cutting large batches of workpieces at minimum time. In case of using a rear part with a manifold no additional equipment, such as a nozzle needs to be mounted to the band saw frame.

The guide block assemblies of the present invention have many advantageous over the prior art devices for the same purpose.

Such advantages include but are not limited to the advantages stated above.

Despite the prejudices within the art the present inventor has managed to innovate the structure of a guide block assembly so that heat development is substantially reduced, even for modern band saws that need to run with speeds as high as between 100-120 m/s to keep production rates high.

An exemplary H-shaped thrust slat may be 169.9 mm±0.1 mm long, 19±0.1 mm high, 7.75 mm±0.25 mm thick, where one or both of the respective inner and outer legs of the H-shaped thrust slat is/are 2.5 mm±0.05 mm thick. It should be noted that the size, design and dimension of an H-shaped thrust slat is associated with the size, design and dimension of the receiving means. Thus the numbers given above can vary depending on the size, design and dimension of the front part. A thickness of a thrust slat between 7-11 mm is however foreseen as being particular advantageously seen from a cost perspective.

What is claimed is:

1. A system comprising
a band saw (44) including a saw blade (39) that runs over pulley wheels (42,43);
two guide block assemblies (1*a*, 1*b*; 46) of the kind for controlling, from an interior side only of the saw blade (39) of the band saw (44), said saw blade during cutting, by applying tension to said saw blade (39) to arrange a cutting section of said saw blade offset from and parallel to a tangent plane to the pulley wheels (42,43) of the band saw (44), wherein the respective guide block assemblies (1*a*, 1*b*; 46) include
a mounting part (2,3;32,3) having a rear part (2;32;62) adapted for securing the respective guide block assemblies (1*a*, 1*b*; 46) to the band saw frame and a front part (3) for detachably securing a thrust part,
wherein the thrust part includes at least two thrust slats (4*a*,4*b*) detachably secured in respective at least two receiving means (10*a*, 10*b*) of or on a front face of the front part (3) of the mounting part, wherein the thrust slats (4*a*,4*b*) are aligned and spaced apart from each other, wherein the thrust slats (4*a*,4*b*) are in contact with the orbiting saw blade (39) to keep the saw blade (39) stretched and under tension when the cutting section of the band saw blade is arranged to be offset from and parallel to the tangent plane to the pulley wheels (42,43) of the band saw (44), and wherein the saw blade (39) has a width of 80-360 mm.

2. The system according to claim 1, wherein the thrust slat (4*a*,4*b*) is arranged in the respective receiving means (10*a*, 10*b*) so that it can move from side to side in a direction that is perpendicular to a moving direction of the saw blade (39) when not subjected to the force from the running saw blade (39).

3. The system according to claim 1, wherein the respective guide block assemblies (1*a*, 1*b*; 46) comprise retaining means (5*a*,5*b*) for retaining the thrust slats (4 *a*,4*b*) in the receiving means (10*a*,10*b*).

4. The system according to claim 3, wherein the retaining means is selected from the group comprising engagement means, force fitting means, snap coupling means, and/or male/female coupling means.

5. The system according to claim 3, wherein the retaining means includes at least one end stop (5*a*,5*b*) at an end of the front part (3).

6. The system according to claim 3, wherein the retaining means for retaining the thrust slats (4*a*,4*b*) in the receiving means (10*a*,10*b*) excludes adhesives that adheres the thrust slat(s) to the receiving means (10*a*, 10*b*), and/or screws that are screwed into the thrust slat(s) (4*a*,4*b*).

7. The system according to claim 1, wherein the receiving means (10*a*,10*b*) of the front part (3) of the mounting part are opposite parallel grooves (10*a*,10*b*) for detachably securing the respective thrust slat (4*a*,4*b*).

8. The system according to claim 1, wherein at least one of the at least two thrust slats (4*a*,4*b*) is an H-profile and the corresponding receiving means (10*a*, 10*b*) is a groove (10*a*, 10*b*) having a C-shaped cross-section.

9. The system according to claim 1, wherein the rear part (2,32) has a first coupling profile (17) facing towards a mating second coupling profile (18) of the front part (3).

10. The system according to claim 1, wherein an elongate center section (22) of the front part (3) between the spaced apart receiving means (10*a*,10*b*) has at least one through-opening or hole (21) for securing said front part (3) to said rear part (2;32;62) through the front face of said front part (3).

11. The system according to claim 10, wherein the front part (3) is secured to the rear part (2;32;62) by means of bolts (20) through the center section (22).

12. The system according to claim 10, wherein the rear part (2;32;62) has an integrated manifold (33) for supplying a fluid agent to the saw blade (39), wherein the manifold (33) discharges into a plurality of outlets (38*a*,38*b*,38*c*) at the center section (22) of the front part (3).

13. The system according to claim 12, wherein the fluid agent is selected from the group of agents including a coolant agent, a lubricating agent, and/or a cleaning agent, optionally the fluid agent comprises air, gas, water, and/or oil.

14. The system according to claim 12, wherein the rear part (2;32;62) has means (6;6') for securing the respective guide block assemblies (1*a*, 1*b*; 46) to the band saw frame.

15. The system according to claim 14, the means (6;6') of the rear part (2;32;62) for securing the respective guide block assemblies (1*a*, 1*b*; 46) to the band saw wherein the band saw frame has a rod coupling (6;6'), which the rod coupling (6;6') has a rod (7) connected to or integral with the rear part (2;32;62) and protruding there-from.

16. The system according to claim 15, wherein the rod (7) has a through-going bore (66) in communication with the manifold (33).

17. The system according to claim 1, wherein the length of the respective receiving means (10*a*,10*b*) is longer than the length of the respective thrust slat (4*a*,4*b*).

18. The system according to claim 1, wherein at least an outer face (31*a*,31*b*) of the thrust slat (4*a*,4*b*) has a friction-reducing surface.

19. The system according to claim 1, wherein a single end stop (5*a*,5*b*) spans the open ends of at the at least two receiving means (10a, 10b) and can be secured to an end part or end face of the front part (3).

20. The system according to claim 1, further comprising a blade scraper component (47) for cleaning the saw blade (39).

21. The system according to claim 20, wherein the blade scraper component (47) has a scraper edge (52) which is above and spaced from the thrust slat (4a,4b) that has the first contact with the saw blade (39).

22. The system according to claim 20, wherein the blade scraper component (47) comprises an angle brace (49) that is position-adjustably mounted on the mounting part (2,3; 32,3).

23. The system according to claim 22, wherein the blade scraper component (47) is mounted protruding from the rear part (2;32;62) on the angle brace (49), wherein the angle between the legs (49a,49b) of the angle brace (49) is larger than 90° and smaller than 180°.

24. The system according to claim 1, wherein the respective guide block assemblies (1a, 1b; 46) have a fluid guiding component (48) for blocking a part of the gap (22) between the opposite thrust slats (4a,4b).

25. The system according to claim 24, wherein the fluid guiding component (48) has an exterior face (60) that is retracted from the plane of the thrust faces (31a,31b).

26. The system according to claim 1, wherein at least the rear part (2;32;62) and the front part (3) of the mounting part (2,3;32,62,3) is an integral unit made by machining a solid metal block or made by molding.

27. The system according to claim 1, wherein the two guide block assemblies (1a,1b;46) are spaced apart from each other at the cutting section (41) of the saw blade (39) and pressing on the interior side of the saw blade (39) without an exterior counter guide block assembly (1;46) to arrange the cutting section (41) of the saw blade (39) offset and substantial parallel to a tangent plane to the pulley wheels (42,43) of the band saw (44).

28. The system according to claim 1, wherein the band saw (44) has at least one a pulley wheel (42,43) diameter of 1000-2500 mm, one or two crowned pulley wheels (42,43), a cutting speed of at least 1800 m/min., 1800-6000 m/min, or greater than 6000 m/min.

29. The system according to claim 1, wherein the thrust slat (4a,4b;67) has wear indication means (73).

30. The system according to claim 29, wherein the wear indication means (73) is selected from an impression, a depression or a recess (74) provided in the longitudinal thrust face (72a,72b).

31. The system according to claim 1, wherein the thrust slat (4a,4b;67) has at least one cooling channels (71).

32. A method of mounting the thrust slat (4a,4b) in the respective guide block assemblies (1a, 1b; 46) of the system according to claim 1, wherein the method comprises the step of:

(a) inserting the at least two thrust slats (4a,4b) into the respective at least two receiving means (10a,10b) by sideways sliding from one end face of the front part (3) towards the opposite end face of the front part (3) in a direction that is perpendicular to a moving direction of the saw blade (39).

33. The method of mounting the thrust slat (4a,4b) according to claim 32, wherein the method further comprises the step of:

(b) securing at least one end stop (5a,5b) at an end face of the front part (3).

34. A method of mounting the respective guide block assemblies (1a, 1b; 46) of the system according to claim 1 to a band saw (44), wherein the method comprises mounting the front part (3) to the rear part (2;32;62) via the front face of the front part (3), and mounting the rear part (2;32;62) to the band saw (44) so that the thrust slats (4a,4b) are in contact with the saw blade (39) to tension said saw blade (39) during cutting.

35. A system comprising a band saw (44) including a saw blade (39) that runs over pulley wheels (42,43), the band saw (44) being configured to cut a workpiece (40);

two guide block assemblies (1a, 1b; 46) of the kind for controlling, from an interior side only of the saw blade (39) of the band saw (44), said saw blade during cutting, by applying tension to said saw blade (39) to arrange a cutting section of said saw blade offset from and parallel to a tangent plane to the pulley wheels (42,43) of the band saw (44), wherein the respective guide block assemblies (1a, 1b; 46) include a mounting part (2,3;32,3) having a rear part (2;32;62) adapted for securing the respective guide block assemblies (1a, 1b; 46) to the band saw frame and a front part (3) for detachably securing a thrust part, the thrust part includes at least two thrust slats (4a,4b) detachable secured in respective at least two receiving means (10a, 10b) of or on a front face of the front part (3) of the mounting part, and which the thrust slats (4a,4b) are aligned and spaced apart from each other wherein the other side of the saw blade (39) of the band saw (44) is free from engagement other than the workpiece (40), and wherein the thrust slats (4a,4b) are in contact with the orbiting saw blade (39) to keep the saw blade (39) stretched and under tension when the cutting section of the band saw blade (44) runs is arranged to be offset from and parallel to the tangent plane to the pulley wheels (42,43) of the band saw (44), and wherein the saw blade (39) has a width of 80-360 mm.

* * * * *